(12) United States Patent
Otterson

(10) Patent No.: US 7,448,476 B2
(45) Date of Patent: Nov. 11, 2008

(54) BRAKE ASSEMBLY AND CONTROL MECHANISM FOR A CART, AND METHOD

(75) Inventor: Dan L. Otterson, Stacy, MN (US)

(73) Assignee: Smart Carte, Inc., St. Paul, MN (US)

( * ) Notice: Subject to any disclaimer, the term of this patent is extended or adjusted under 35 U.S.C. 154(b) by 0 days.

(21) Appl. No.: 10/704,220

(22) Filed: Nov. 6, 2003

(65) Prior Publication Data

US 2004/0144601 A1 Jul. 29, 2004

Related U.S. Application Data

(60) Provisional application No. 60/425,088, filed on Nov. 8, 2002.

(51) Int. Cl.
*B62B 5/04* (2006.01)
(52) U.S. Cl. .............. 188/19; 188/29; 188/31; 188/265; 280/33.991; 280/33.998
(58) Field of Classification Search .......... 188/19, 188/20, 21, 1.12, 29, 31, 60, 69, 265; 280/33.991, 280/33.994, 33.998
See application file for complete search history.

(56) References Cited

U.S. PATENT DOCUMENTS

| | | | | |
|---|---|---|---|---|
| 3,174,768 A | * | 3/1965 | Sanders et al. .......... | 280/33.994 |
| 3,951,426 A | * | 4/1976 | Shaffer et al. ............ | 280/47.34 |
| 3,978,959 A | | 9/1976 | Muellner | |
| 4,018,449 A | | 4/1977 | Anderson | |
| 4,084,663 A | * | 4/1978 | Haley ........................... | 188/31 |
| 4,593,922 A | * | 6/1986 | Upshaw et al. .......... | 280/33.992 |
| 5,090,517 A | * | 2/1992 | Doughty ...................... | 188/19 |
| 5,149,114 A | * | 9/1992 | Lewandowski et al. | 280/33.992 |
| 5,288,089 A | * | 2/1994 | Bowers et al. ......... | 280/33.994 |
| 5,325,938 A | * | 7/1994 | King ........................... | 188/19 |
| 5,370,408 A | * | 12/1994 | Eagan ................... | 280/33.994 |
| 5,383,536 A | * | 1/1995 | Butter et al. ............... | 188/1.12 |
| 5,456,336 A | | 10/1995 | Bopp | |
| 6,041,894 A | | 3/2000 | Otterson et al. | |
| 6,237,725 B1 | * | 5/2001 | Otterson et al. ............... | 188/19 |
| 6,298,949 B1 | * | 10/2001 | Yang et al. .................... | 188/20 |
| 6,311,809 B1 | * | 11/2001 | Thomas et al. ............. | 188/72.9 |
| 6,561,333 B2 | | 5/2003 | Larson et al. | |

FOREIGN PATENT DOCUMENTS

| | | |
|---|---|---|
| DE | 78 22 236 | 10/1978 |
| DE | 34 42 124 A1 | 5/1986 |
| DE | 36 15290 A1 | 12/1986 |

OTHER PUBLICATIONS

Certified English translation of German Reference No. DE3442124A1, 10 Pages.

* cited by examiner

*Primary Examiner*—Robert A. Siconolfi
*Assistant Examiner*—Mariano Sy
(74) *Attorney, Agent, or Firm*—Merchant & Gould P.C.

(57) ABSTRACT

A cart having a frame for conveying cargo. The cart includes at least one brake assembly mounted within the frame of the cart. The brake assembly is configured to provide braking by engaging and disengaging a rear wheel axle. The cart further includes a control mechanism configured to selectively engage and disengage the brake assembly by rotation of a cart handle. In addition, the cart includes a brake release device configured to disengage the brake assembly when carts are nested.

26 Claims, 27 Drawing Sheets

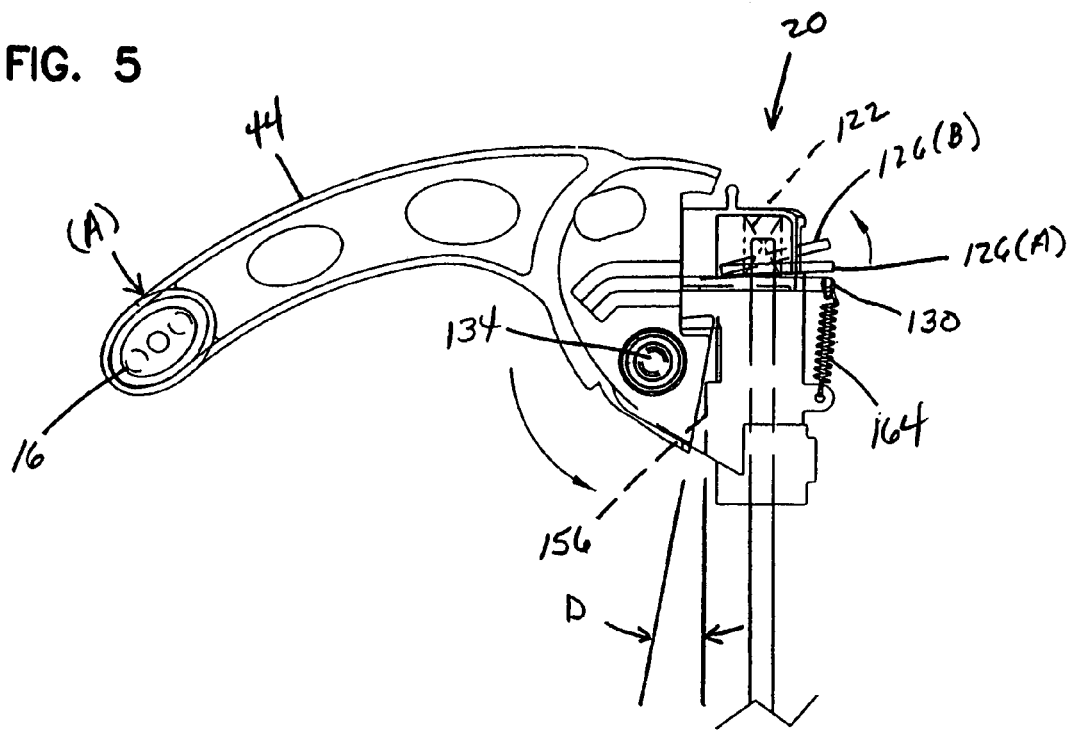
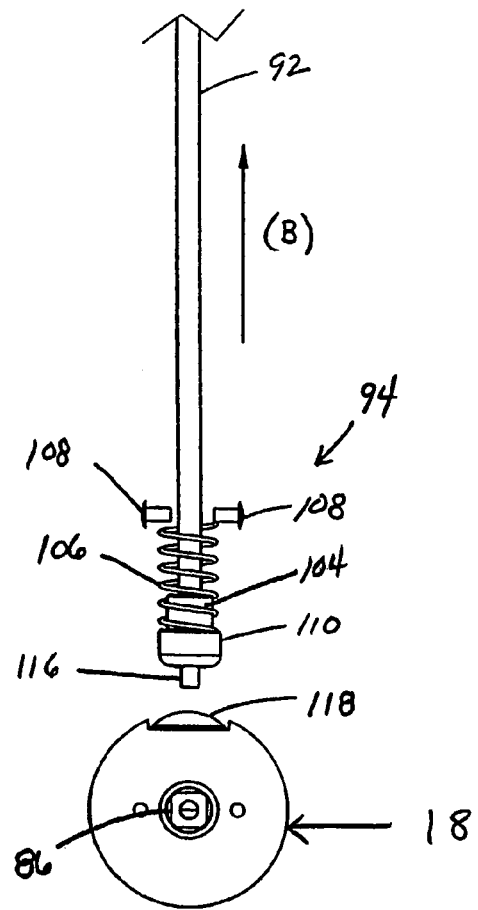
FIG. 5

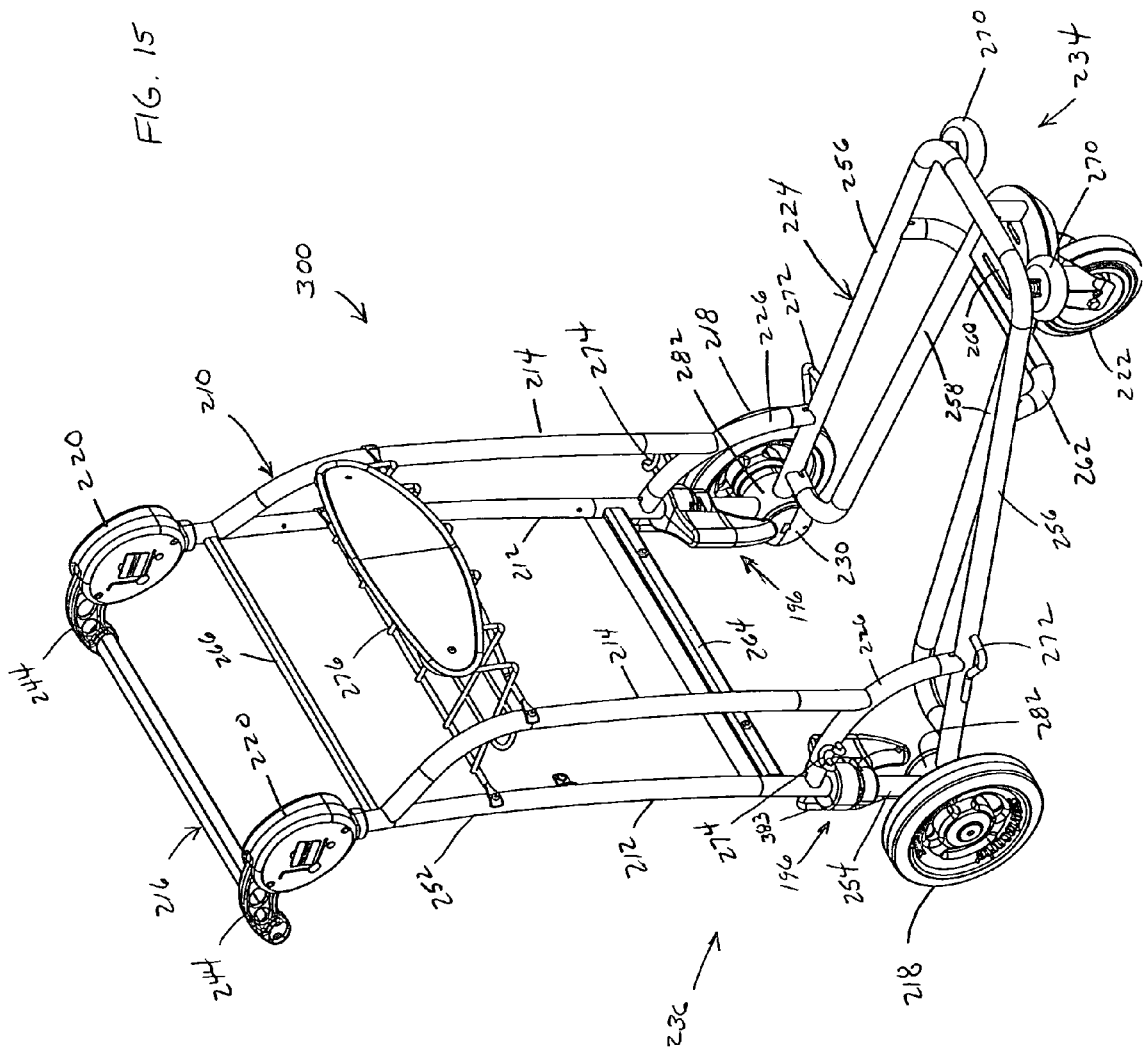

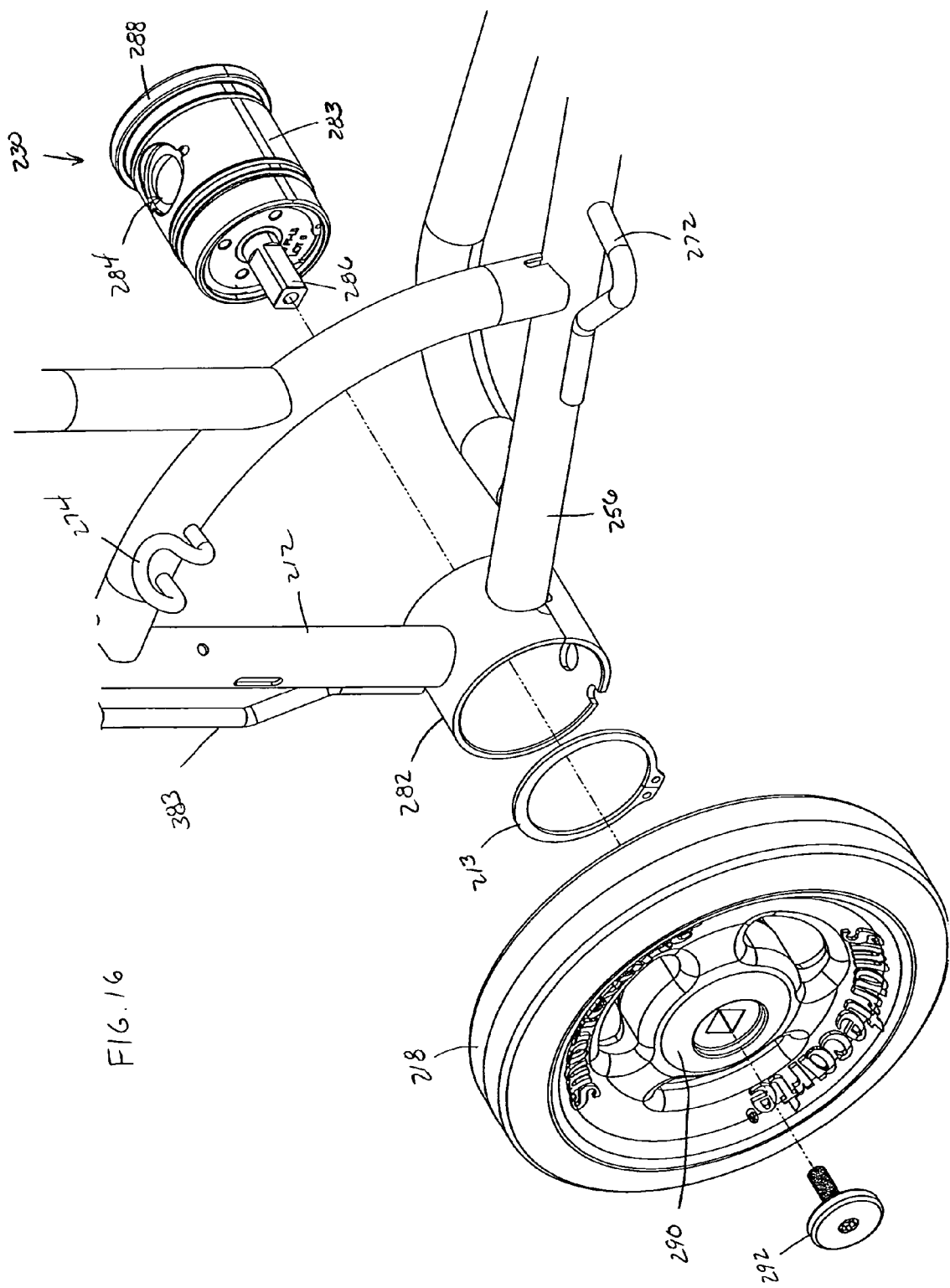

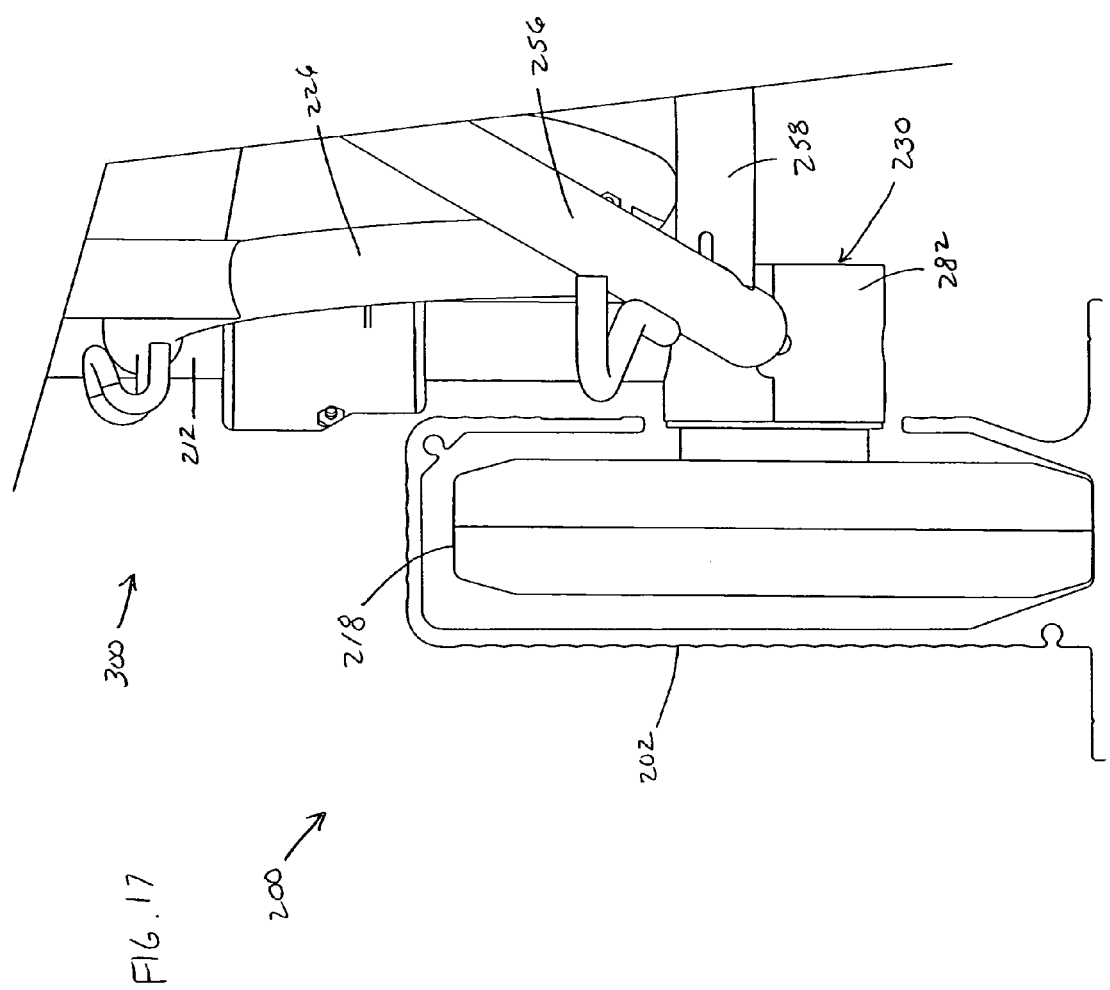

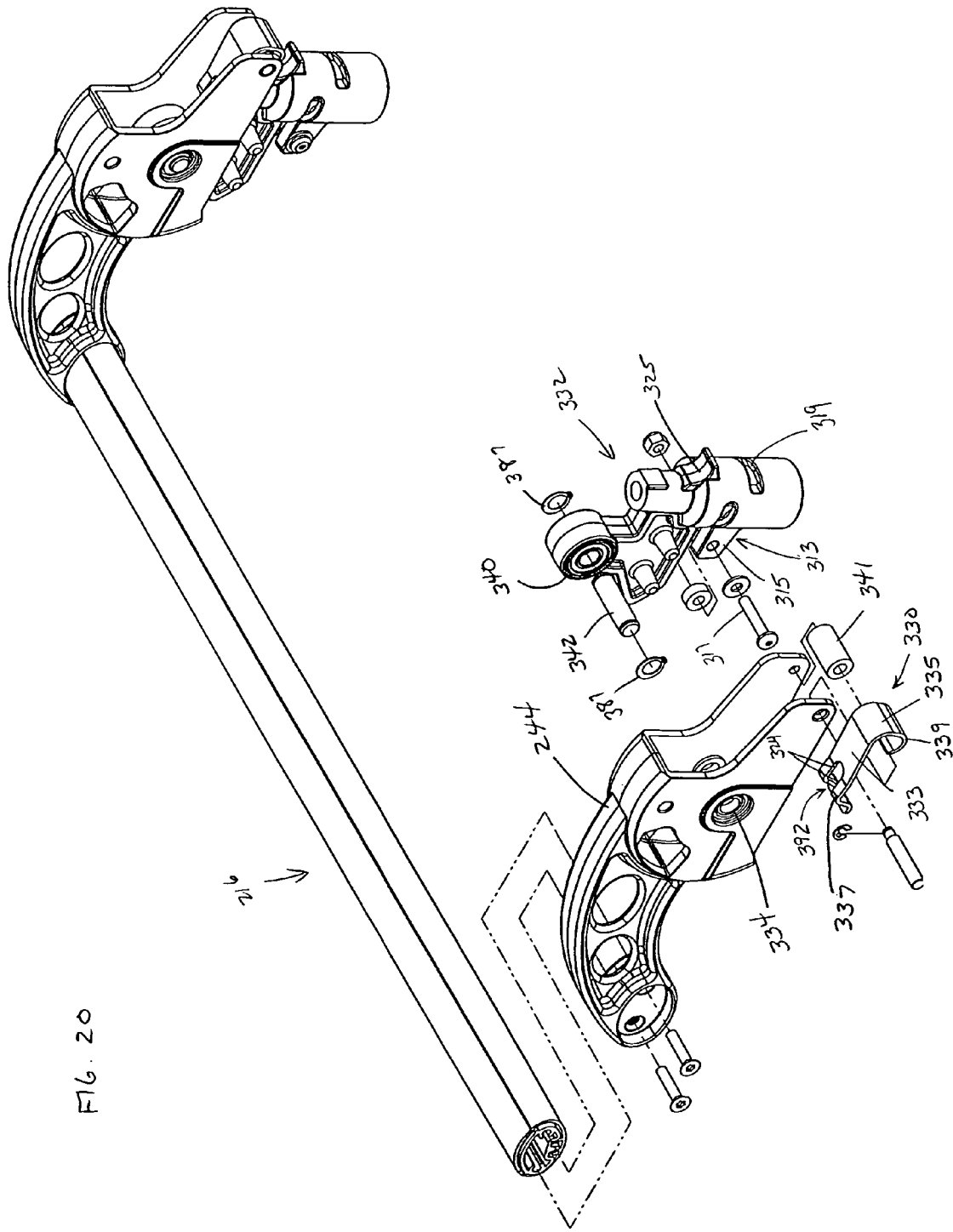

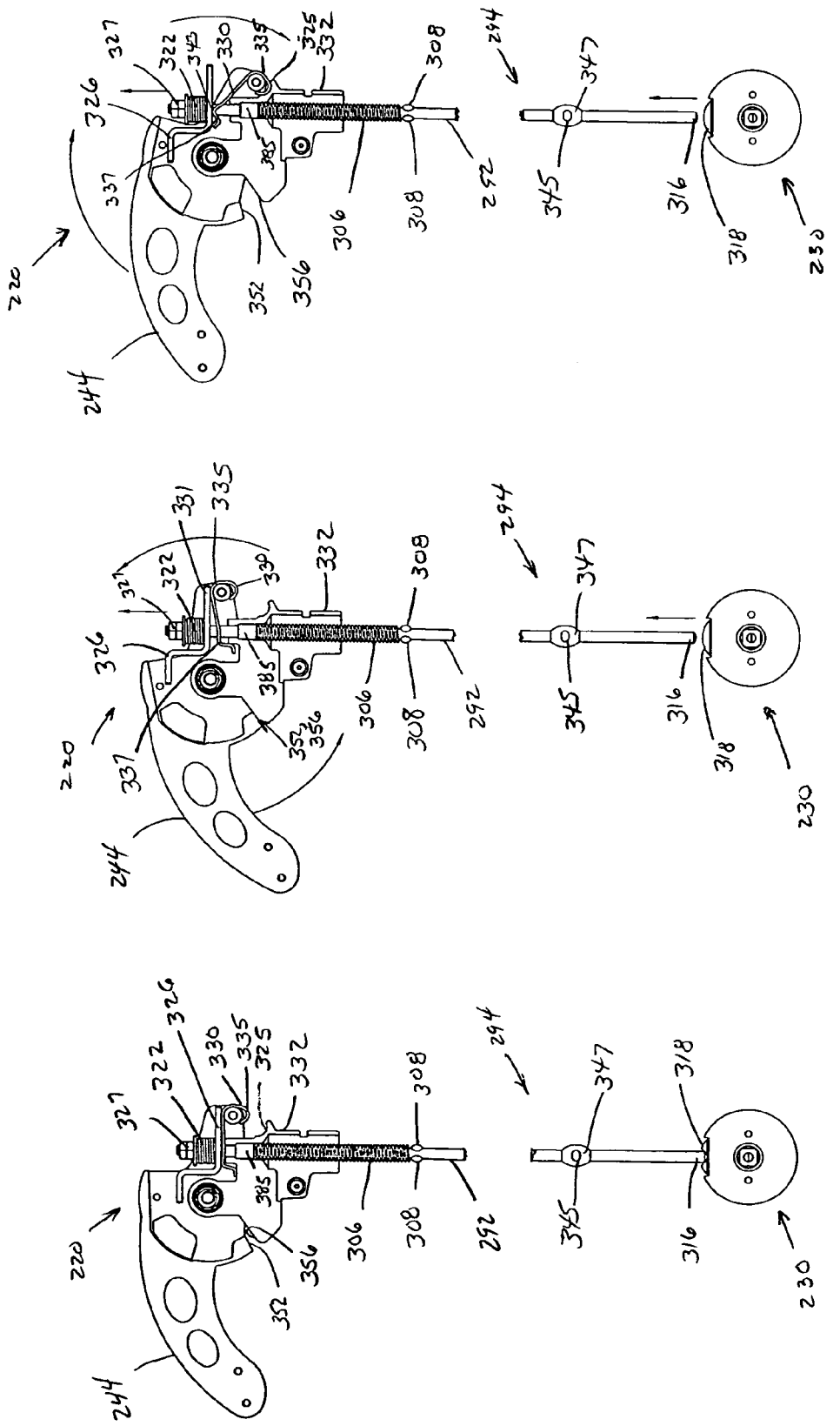

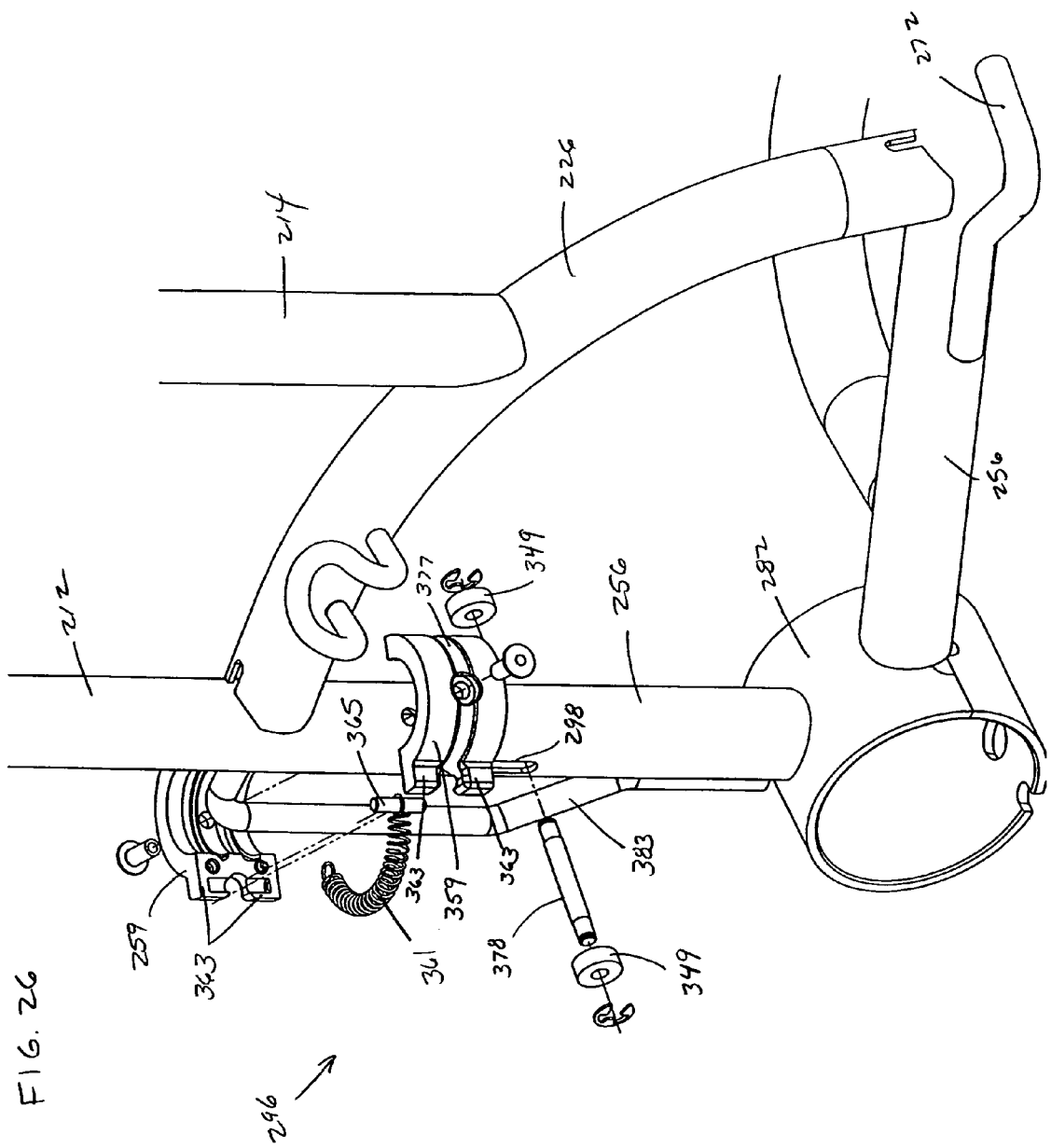

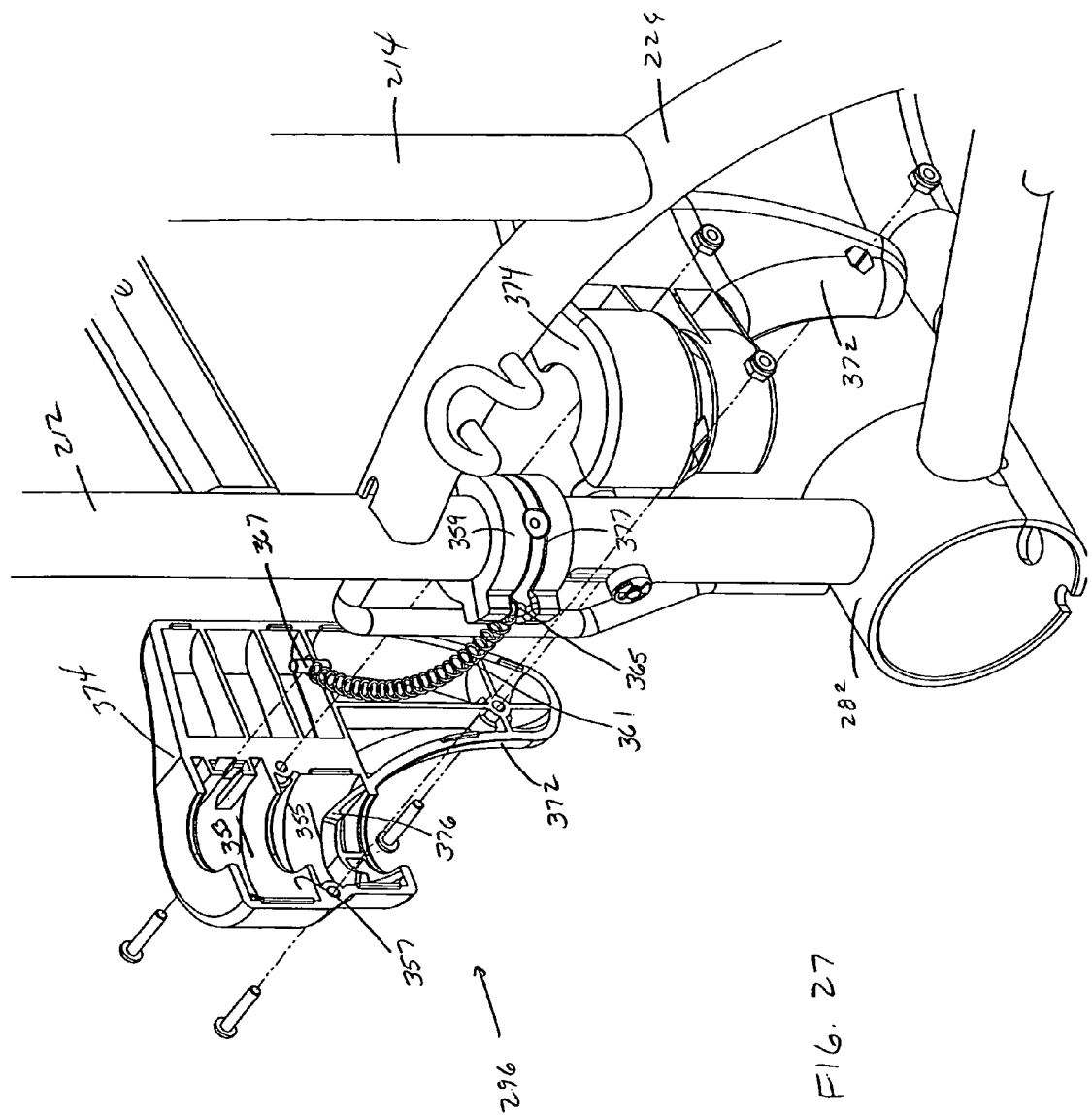

BRAKE ASSEMBLY AND CONTROL MECHANISM FOR A CART, AND METHOD

CROSS-REFERENCE TO RELATED APPLICATIONS

This application claims the benefit of a U.S. Provisional Application Ser. No. 60/425,088, filed on Nov. 8, 2002, which application is herein incorporated by reference.

TECHNICAL FIELD

This invention generally relates to a braking mechanism for a wheeled cart. More particularly, the invention relates to a brake assembly, control mechanism, and method of braking for use with a wheeled cargo cart.

BACKGROUND

Carts are used to transport items in commercial establishments, such as groceries in supermarkets and luggage in airports. Customers place their items into such carts in order to transport the items to their parked vehicle or other destinations. When customers are done with the carts, the carts are placed in central collection areas or simply left unattended. Often the central collection areas serve as rental and return stations such that the customer is reimbursed for returning a cart.

Unattended carts pose problems. Many existing carts do not have brakes. These unrestrained carts can roll freely and cause damage to both persons and property. This is of particular concern on train platforms, where an unrestrained cart can cause damage to the transportation system. The carts themselves also sustain damage thereby reducing the useful life of the cart. Therefore a brake system is needed that automatically engages when the cart is left unattended in certain installations.

Several attempts have been made to employ brakes in cart. Most existing cart brakes operate against the tire tread of a cart wheel. This has several disadvantages. For example, the tire tread can become abnormally worn down, reducing the traction and ultimate safety of the cart. As the tread wears, brake performance is diminished. In addition, the wheels must be replaced at regular intervals which increases the overall cost of maintaining carts. Also, brake mechanisms acting on the outside of the wheel are more susceptible to damage, e.g., the brakes can be easily struck by a foreign object such as a foot or other carts. In addition, tire treads have a tendency to pick up debris, water and other contaminants which can damage and reduce the overall effectiveness of the braking mechanism. Therefore a need exists for a durable brake which will not degrade the tire nor reduce the operational safety of the cart.

Further, nestable carts place certain demands on the braking system. First, the braking system must be compatible with the typical rental-return station. A common type of rental-return station accepts the rear wheel of a cart through a guided wheel slot. The wheel fits snugly within the slot, and the slot opening is locked to prevent unauthorized access. Brake arrangements that operate by engaging the tire tread are typically positioned on the outside of the wheel, and do not easily fit within the guided wheel slot. Even if the brake fits within the slot, it is highly susceptible to damage by the guided wheel slot.

Another requirement of nestable carts is the release of the braking mechanism. Carts are often nested together and returned to a central collection area in a long train arrangement. When the carts are nested, all brakes must be released in order to transport the train arrangement.

Therefore, a need exists for a durable cart brake mechanism that will automatically engage when left unattended, and be configured for receipt within guided wheel slots of return stations. The brake must also disengage when nested with another cart to facilitate en masse cart movement.

SUMMARY

One aspect of the present invention relates to a cart having a frame with support members that define a cargo carrying region. The cart also includes a moveable handle connected to the frame and a brake assembly mounted to the frame. The brake assembly includes a brake mechanism and an axle. A wheel is mounted to the axle. The brake mechanism of the brake assembly is configured to engage the axle to provide braking operation of the cart, and disengage from the axle to permit free rotation of the axle.

Another aspect of the present invention relates to a brake and control assembly for a cart, the cart having a frame, a handle, and a wheel. The brake and control assembly includes a brake assembly and a brake control arrangement. The brake assembly is configured to mount to the frame of a cart, and includes a brake mechanism and an axle. The brake mechanism is arranged to selectively engage and disengage the axle during braking and non-braking operation of a cart. The brake control arrangement is configured to couple to the handle of a cart and includes a brake rod. The brake rod has an end positioned adjacent to the brake assembly to control the braking and non-braking operation of a cart.

Yet another aspect of the present invention relates to a method of operating a cart, the method including providing a cart having a frame, a moveable handle connected to the frame, a brake assembly having a brake mechanism and an axle, and a wheel mounted to the axle. The method further includes rotating the handle of the cart to disengage the brake assembly to permit free rotation of the axle, and releasing the handle to engage the brake assembly such that the brake mechanism contacts the axle to provide braking operation of the cart.

Still another aspect of the present invention relates to a cart for carrying cargo having a frame a moveable handle and a brake assembly. The brake assembly is configured to engage and disengage by rotation of the moveable handle. The cart also includes a brake release device. The brake release device is configured to pivot from a first position to a second position, wherein the brake assembly disengages to permit transport of the wheel when the brake release device is in the second position.

And another aspect of the present invention relates to a method of transporting carts, including a first cart and a second cart, each of the carts having a brake release pivotably mounted thereto. The method includes pivoting the brake release device of the first cart from a first position to a second position by nesting the second cart within the first cart, and disengaging a brake assembly of the first cart by pivoting the brake release device of the first cart to the second position.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

DESCRIPTION OF THE DRAWINGS

FIG. 5 is a side elevational view of the actuation assembly of FIG. 4 and the brake control mechanism of FIG. 1.

FIG. 15 is a perspective view of another cart employing a brake assembly and another embodiment of a brake control mechanism and brake release device of the present invention.

FIG. 16 is an exploded perspective view of the brake assembly and a rear wheel of FIG. 15.

FIG. 17 is a front elevational view of the cart of FIG. 15 placed in a return station.

FIG. 20 is a further exploded, partial view of the brake control mechanism of FIG. 19;

FIG. 21 is a side elevational view of the actuation assembly of FIG. 18 and the brake control mechanism of FIG. 20, shown in a release position.

FIG. 22 is a side elevational view of the actuation assembly and the brake control mechanism of FIG. 21, shown in a first rotated position.

FIG. 23 is a side elevational view of the actuation assembly and the brake control mechanism of FIG. 21, shown in a second rotated position.

FIG. 26 is a partial, exploded, perspective view of the brake release device embodiment of FIG. 15.

FIG. 27 is an exploded perspective view of the brake release device of FIG. 15.

DETAILED DESCRIPTION

Figure 1:
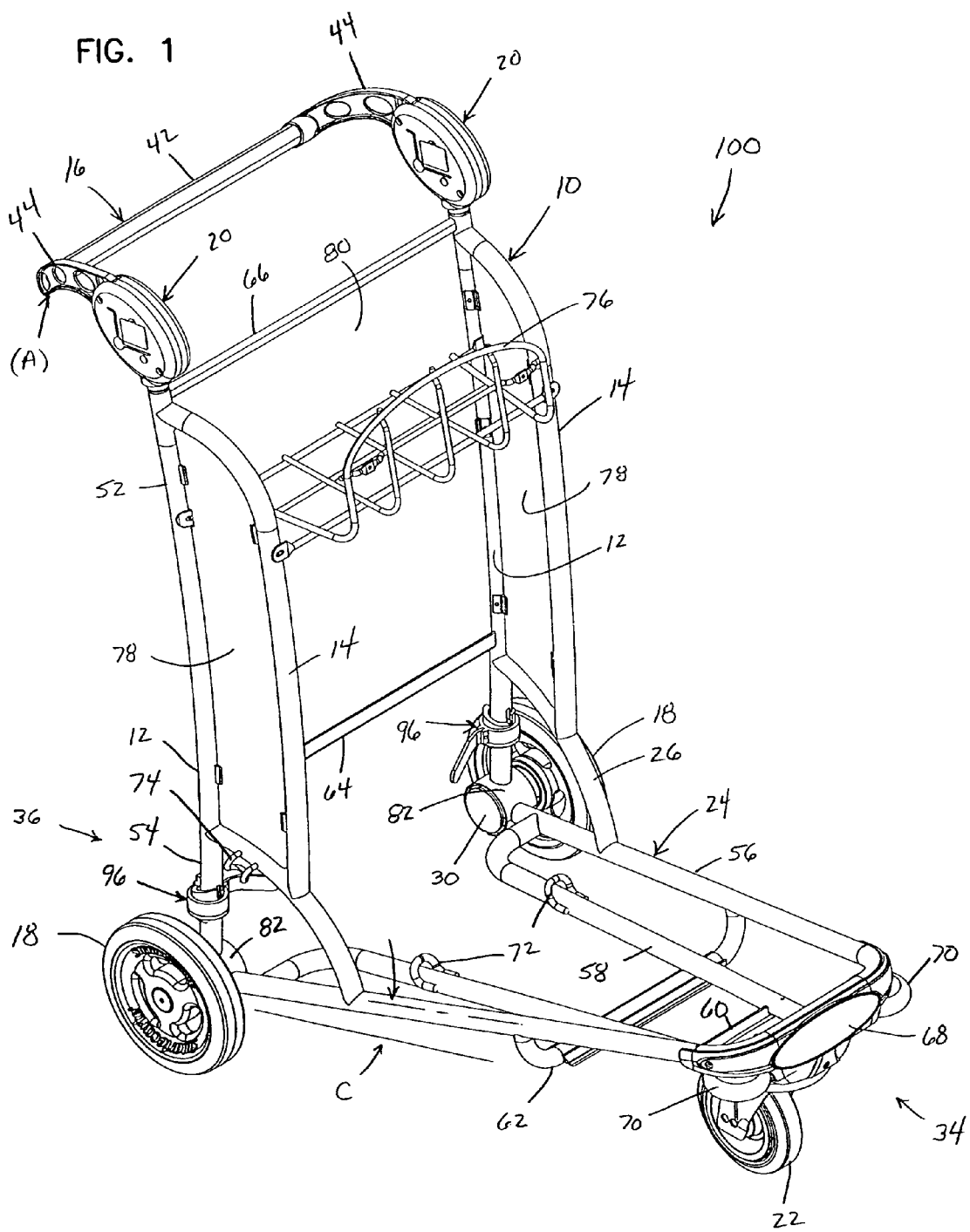
FIG. 1 is a perspective view of a cart employing one embodiment of a brake assembly and brake control mechanism of the present invention.

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Referring generally to FIG. 1, the present invention relates to a brake assembly 30 and a brake control mechanism 20 for a wheeled cart 100. In use, the brake assembly 30 is normally engaged when a handle 16 of the cart 100 is released, that is, the brake assembly prevents the cart from rolling when the handle is not rotated. When the handle 16 is depressed (i.e. rotated or pushed downward), the brake assembly 30 is disengaged and the cart 100 is permitted to roll.

The present invention has many advantages. One advantage is that the brake assembly 30 is normally engaged when the cart 100 is left unattended. This enhances the overall safety of the cart 100 and ensures that the cart is not subjected to damage due to uncontrolled movement.

Another advantage is that the brake assembly 30 does not interact with the wheel 18 when braking. As a result, braking action is not affected by wheel wear nor does the brake assembly inflict undue damage on the tire tread. Further brake performance is not affected by sand, moisture, or other damaging contaminants that are airborne or would be picked up by the tire tread. This lengthens the useful life of the brake assembly and the wheel.

Still another advantage is that the brake assembly 30 does not interfere with existing guided wheel slots of rental-return stations 200 (FIG. 3), which capture and release the rear wheel 18 of the cart 100. In addition, the present brake assembly provides braking action in both the forward and reverse directions. Finally, the brake assembly 30 is configured and arranged for easy replacement and maintenance.

The cart 100 illustrated in FIG. 1 is configured for transporting materials, such as packages or luggage, for example. The cart includes a frame 10 generally having a front end 34 and a rear end 36. The frame 10 includes first and second rearward upright support members 12 extending upward from a sleeve joint 82. The first and second rearward upright support members 12 have a hollow tubular construction (shown in FIG. 12). A lower platform 24 extends forward from the sleeve joint 82. A pair of rear wheels 18 are oppositely positioned toward the rear end 36 of the cart 100. A front rotatable caster 22 that permits the cart to turn is mounted to the lower platform 24 toward the front end 34 of the cart 100.

The handle 16 is operably coupled to each of the rearward upright support members 12 to manually control operation of the brake assembly 30 and transport of the cart 100. In particular, the handle 16 is interconnected to first and second brake control mechanisms 20 by first and second lever arms 44. The first and second brake control mechanisms 20 are positioned adjacent to an upper portion 52 of the rearward upright support members 12.

Figure 6:
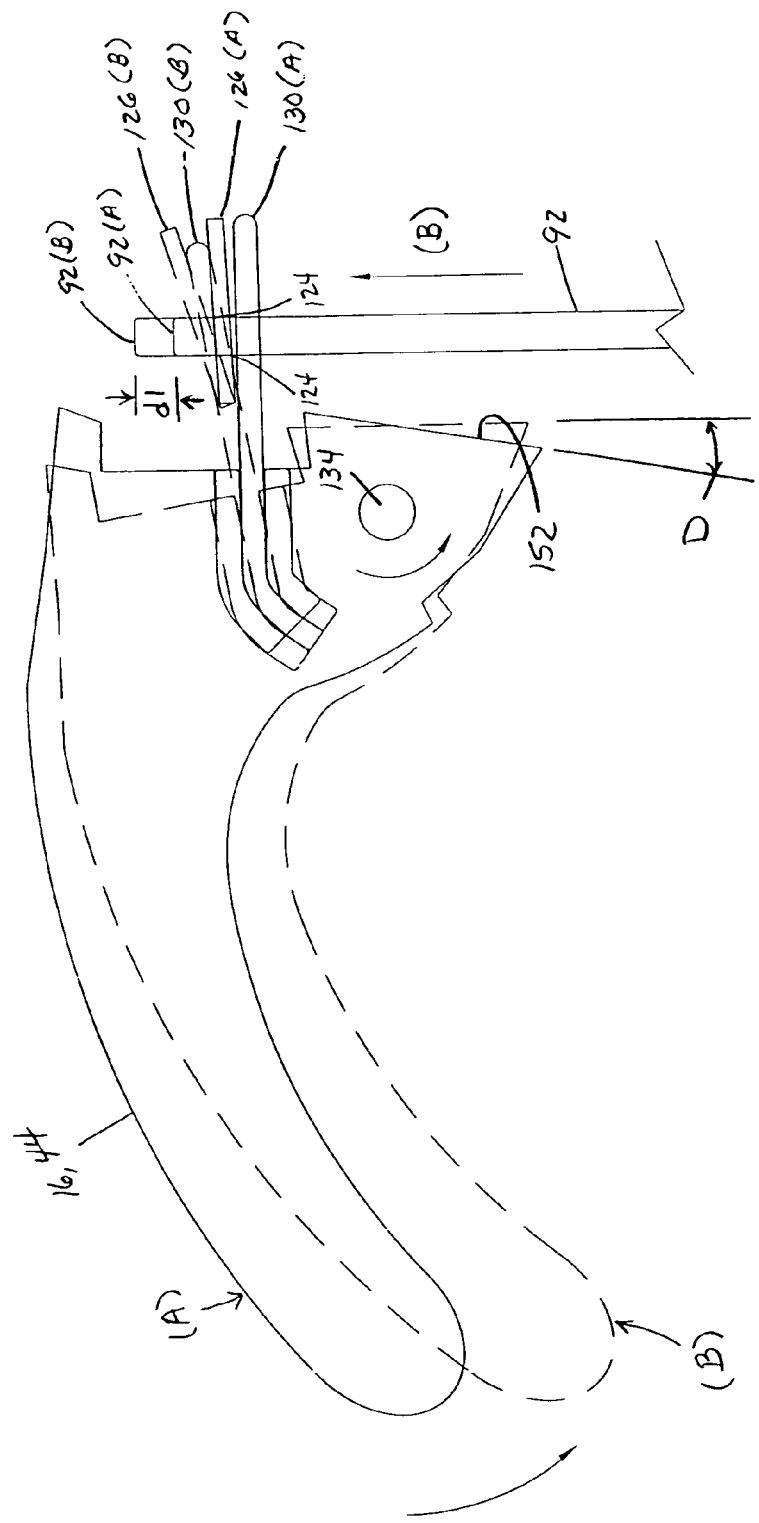
FIG. 6 is a schematic representation of the brake control mechanism of FIG. 5.

The brake control mechanisms 20 operate to engage and disengage the brake assemblies 30. When the handle 16 is released, represented by position (A) in FIG. 1, the brake assemblies 30 are normally engaged and prevent rotation of the rear wheels 18. When the handle 16 is depressed, as represented by dashed lines and position (B) in FIG. 6, the brake assemblies 30 become disengaged and permit rotation of the rear wheels 18.

Still referring to FIG. 1, the frame 10 further includes forward upright support members 14 and cross support members 26. The forward upright support members 14 are connected to the upper portion 52 of the rearward upright support members 12 and to the cross support members 26. The cross support members 26 are connected to a lower portion 54 of the rearward upright support members 12 and to the lower platform 24. In the illustrated embodiment the cross support members 26 have an arcuate shape.

The lower platform 24 of the frame 10 extends forwardly from the rearward upright support members 12. In the illustrated embodiment, the lower platform 24 includes an outer lower support member 56 and an inner lower support member 58.

In the illustrated embodiment, the outer lower support member 56 has a U-shape configuration. The outer lower support member 56 is arranged to extend from the sleeve joint 82 and an angle C relative to the ground. The angle C is constructed so that cargo placed on the lower platform 24 is oriented or angled upward from horizontal to prevent the cargo from falling forward off the cart 100. In a preferred embodiment the angle C is greater than 6 degrees, more preferably, the angle C is between 7 degrees and 20 degrees. Most preferably, the angle C is about 14 degrees.

To further improve cargo stability, the cross support members 26 of the frame 10 are configured so that larger suitcases can be rearwardly tipped or oriented on the lower platform 24 of the cart 100. For example, larger suitcases can be placed on the lower platform 24 of the cart 100 and pushed rearwardly towards the cross support members 26 so that the bottom of the suitcase contacts the most forward end of the cross support member 26. The top end of the suitcase can then be tipped backwards toward the upright support members 12, 14 to lessen the tendency for the suitcase to fall forward.

As can be seen in FIG. 1, a bumper assembly 68 including cushioned side rollers 70 is secured to the outer lower support member 56 at the front end 34 of the cart 100. The bumper assembly 68 and side rollers 70 protects the cart and other objects from damage caused by impact that may occur during use.

Figure 10:
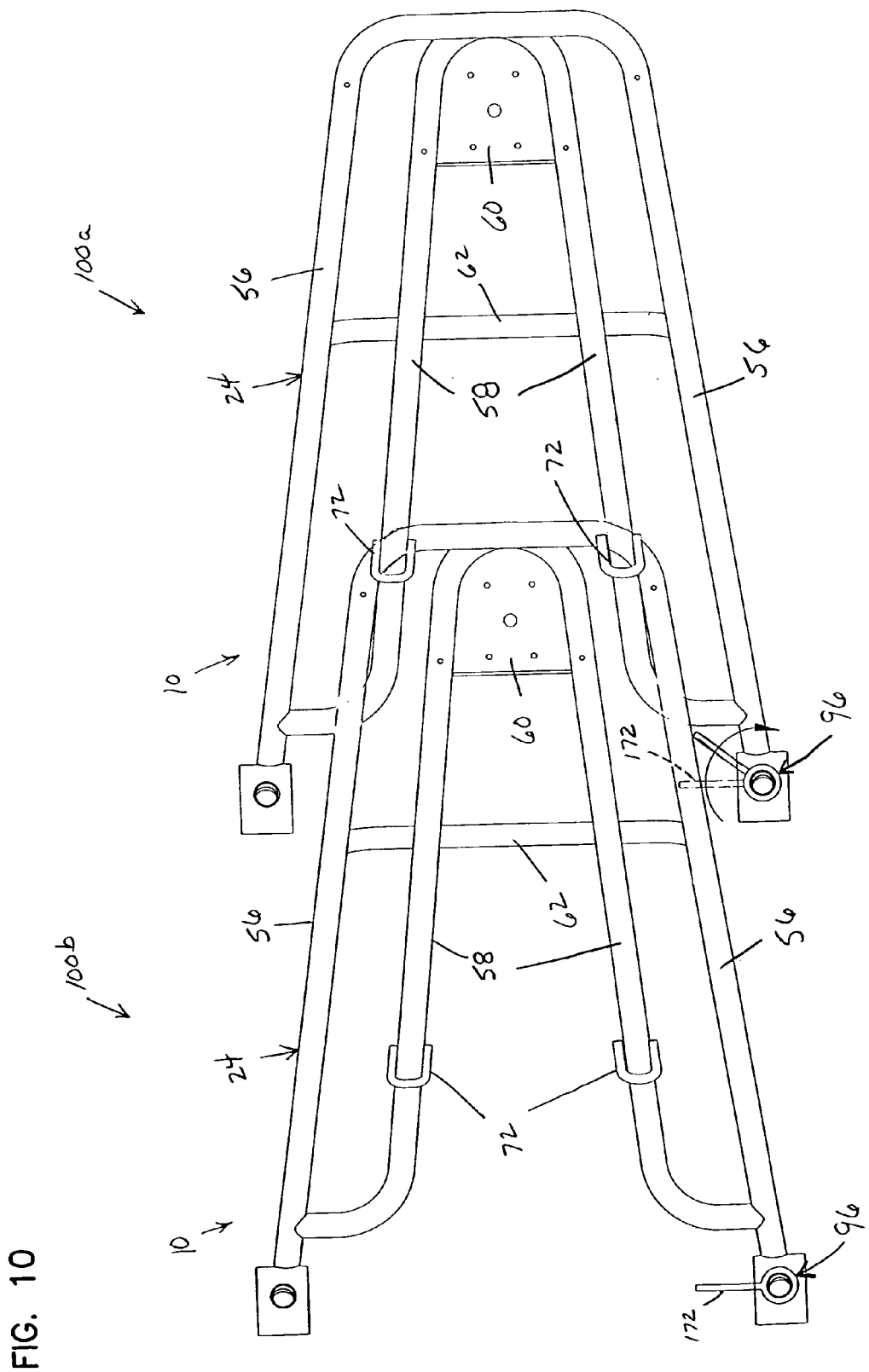
FIG. 10 is a top plan view of a frame of the cart of FIG. 1, shown in part, nested with a second cart frame, also shown in part.

The inner lower support member 58 is connected to, and positioned centrally inward from, the outer lower support member 56. In the illustrated embodiment, the inner lower support member 58 also has a U-shape configuration. As shown in FIG. 10, a mounting bracket 60 is coupled to the inner lower support member 58 toward the front end 34 of the cart 100. The front caster 22 (FIG. 1) is mounted to the cart 100 at the mounting bracket 60.

Still referring to FIG. 1, the frame 10 further includes transverse supports. First and second transverse bars 64, 66 are positioned to structurally support the rearward upright support members 12. The first transverse bar 64 is positioned and coupled to the lower portions 54 of the rearward upright support members 12. The second transverse bar 66 is positioned and coupled to the upper portions 52 of the rearward upright support members 12. A transverse lower support member 62 is interconnected to the outer lower support member 56, extending transversely across the U-shaped configuration. The transverse lower support member 62 structurally supports the lower platform 24.

Referring to FIG. 10, the lower platform 24 is configured such that during nesting operation, the forward end of a trailing cart (e.g. 100b shown in FIG. 10) that is nested within a leading cart 100a rides up on the inner lower support member 58. The forward end of the trailing cart 100b is thereby lifted upward so that the front caster 22 of the trailing cart no longer contacts the ground. This design saves on wear and tear of the front caster 22 during transport of a nested group of carts.

Still referring to FIGS. 1 and 10, a pair of stopping elements 72 is positioned on the inner lower support member 58 of the cart frame 10 to stop forward motion of a trailing cart 100b. In particular, the stopping elements 72 of a leading cart 100a engage the outer lower support member 56 of a trailing cart 100b so that neither of the carts interfere with the other cart's rear wheels 18. The stopping elements 72 also provide a space between successive carts. The space provides "spatial play" between successive carts of a long nested group so that each cart can turn relative to another. The spatial play permits a long nested group to curve or bend during transportation of the nested carts.

During a nested group transport (i.e. transport of a number of nested carts), a rope or cable (not shown) can be hooked and entrained to a loop member 74 (FIG. 1) of each cart. The rope or cable can be used to interconnect each of the nested carts of the group to hold the carts together during movement or transport.

In the illustrated embodiment of FIG. 1, a cargo basket 76 is mounted to the rearward and forward upright support members 12, 14. It is contemplated that the cargo basket 76 can be mounted to other frame components; or that other types and configurations of baskets or cargo carrying structures can be used. The illustrated embodiment further shows side panels 78 located between the rearward and forward upright support members 12, 14; and a rear panel 80 located between each of the rearward upright support members 12. The panels assist to contain luggage or cargo carried on the cart and can further be used as a surface upon which logos, information, or advertisements may be placed.

Figure 2:
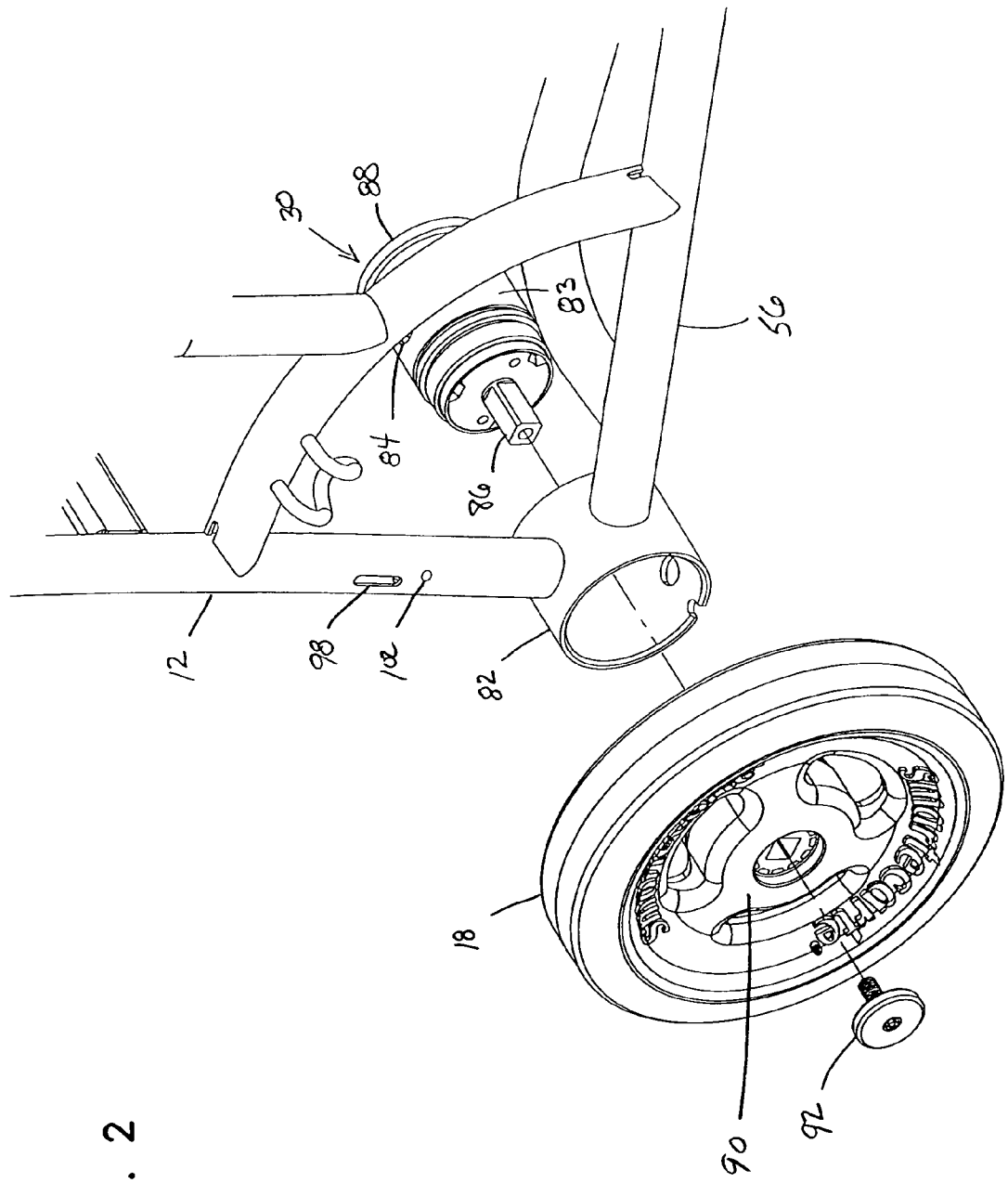
FIG. 2 is an exploded perspective view of the brake assembly and a rear wheel of FIG. 1.

Referring now to FIG. 2, one embodiment of the rear wheel 18 and brake assembly 30 is illustrated. The brake assembly 30 is fixedly positioned and mounted within the sleeve joint 82 of the frame 10. As can be understood, maintenance and replacement of the brake assembly is easily performed, as the brake assembly 30 is readily accessible at the sleeve joint 82. The brake assembly 30 of the illustrated embodiment is a pre-assembled component to also simplify maintenance and replacement. Because of the placement and the pre-assembled configuration of the brake assembly, any necessary replacements can be accomplished less than 2 minutes. In the preferred embodiment, the brake assembly has no expendable parts; thus the entire brake assembly is replaced whenever replacement is necessary. The illustrated brake assembly 30 is a sealed assembly to reduce the frequency of cleaning maintenance and any affect caused by moisture or other contaminates.

The brake assembly 30 includes a housing 83 having an input location 84, and a shoulder 88. The illustrated housing 83 is approximately 1.5 inches in diameter. The shoulder 88 of the housing 83 is configured to position the brake assembly 30 within the sleeve joint 82 such that the input location 84 is aligned with the rearward upright support member 12.

In a preferred embodiment, the brake assembly 30 is a wrap-spring type brake assembly. A typical wrap-spring brake assembly includes a stationery member (not shown), an output member 86, and a torsion spring (not shown) arranged to contact both the stationery member and the output member 86. Wrap-spring brake assemblies require no operating pressure to engage or disengage the brake, such as found in compression-spring type brakes. Rather, the torsion spring, in this embodiment, wraps down upon the output member 86 when engaged. The wrap-spring configuration requires less user effort to engage or disengage the brake, as compared to traditional compression-spring type brakes.

In the illustrated embodiment, the output member 86 of the brake assembly 30 is arranged to operate as a wheel axle; the brake assembly 30 functions to engage and disengage the wheel axle 86 to provide braking action. The rear wheel 18 includes a wheel hub 90 configured to couple with the axle 86. Bearings (not shown) are located within the brake assembly 30. Thus, rotation of the rear wheel 18 occurs only in concert with the axle 86. Because the brake assembly 30 operates to brake the axle 86 rather than contact the wheel 18, the brake assembly 30 can be used with a variety of different sized wheels configured to fit the axle 86.

In the illustrated embodiment, a fastener 92 is used to securely couple the rear wheel 18 to the axle 86. When the wheel 18 is worn, the fastener 92 is simply removed and the wheel replaced, without having to remove or replace the brake assembly 30. Other configurations, such as a cotter pin connection, for example, can be used to couple the rear wheels 18 to the output member 86 in accord with the principles disclosed.

In one embodiment, the brake assemblies 30 are adjustable so that the slip torque of the brake assembly can be modified to fit a customer's particular application. That is, various airports and customers have different needs and standards with regards to preventing carts from rolling. In some situations the brake assembly must be configured to prevent a cart from rolling down a gentle incline; while in other situations the brake assembly must be configured to prevent a cart from rolling down a much steeper incline. Thus, in the preferred embodiment, the brake assembly 30 is adjustable to accommodate a variety of customer applications, while configured and constructed to provide consistent braking power at the selected torque output. One brake assembly that can be used in accord with the principles disclosed is manufactured by Reell Precision Manufacturers, and generally described in U.S. Pat. No. 6,561,333, which U.S. Patent is herein incorporated, in its entirety, by reference. Other types of brakes that operate to engage and disengage an axle to prevent and permit rotation, in accord with the present disclosure, are contemplated.

Figure 3:
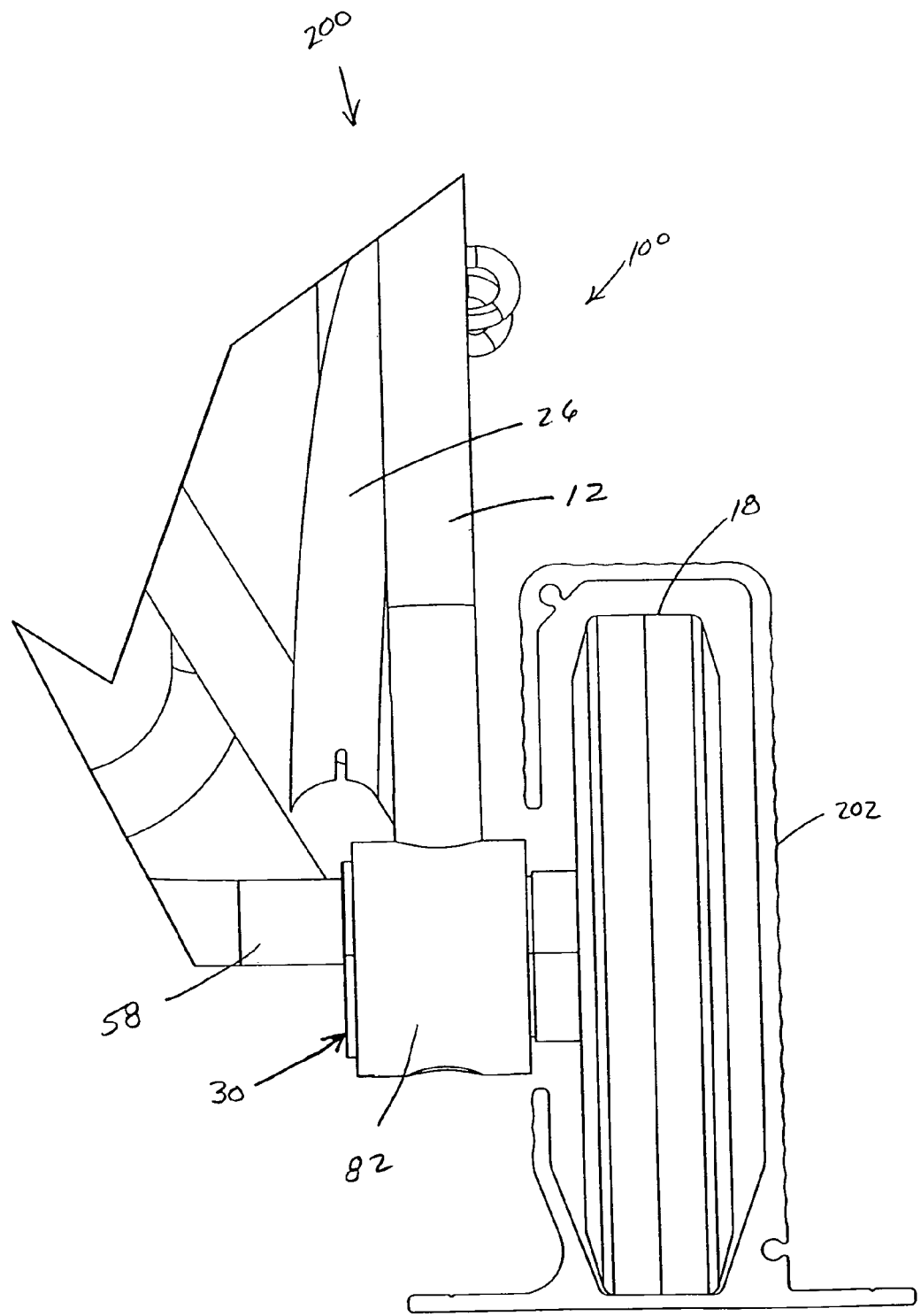
FIG. 3 is a rear elevational view of the cart of FIG. 1 placed in a return station.

Referring now to FIG. 3, the presently disclosed cart embodiment is configured for use with standard vending systems or return stations 200. One example of a return station is described in U.S. Pat. No. 3,978,959, and herein incorporated by reference. A return station typically includes a channel 202 into which at least one of the rear wheels 18 of the cart 100 is retainably placed.

Older conventional carts did not include brakes. Newer conventional carts incorporating brakes are often, incompatible with, or difficult to position within the channel 202 of a return station 200 because of obstruction or interference between the brakes and the channels 202. The present disclosure discloses a cart 100 having a brake assembly 30 that is compatible with existing return stations. In particular, the braking assembly 30 is positioned, and operates, so as to not obstruct the area surrounding the rear wheels 18; so that placement of the rear wheel within the channel 202 of a return station 200 is not hindered.

Figure 4:
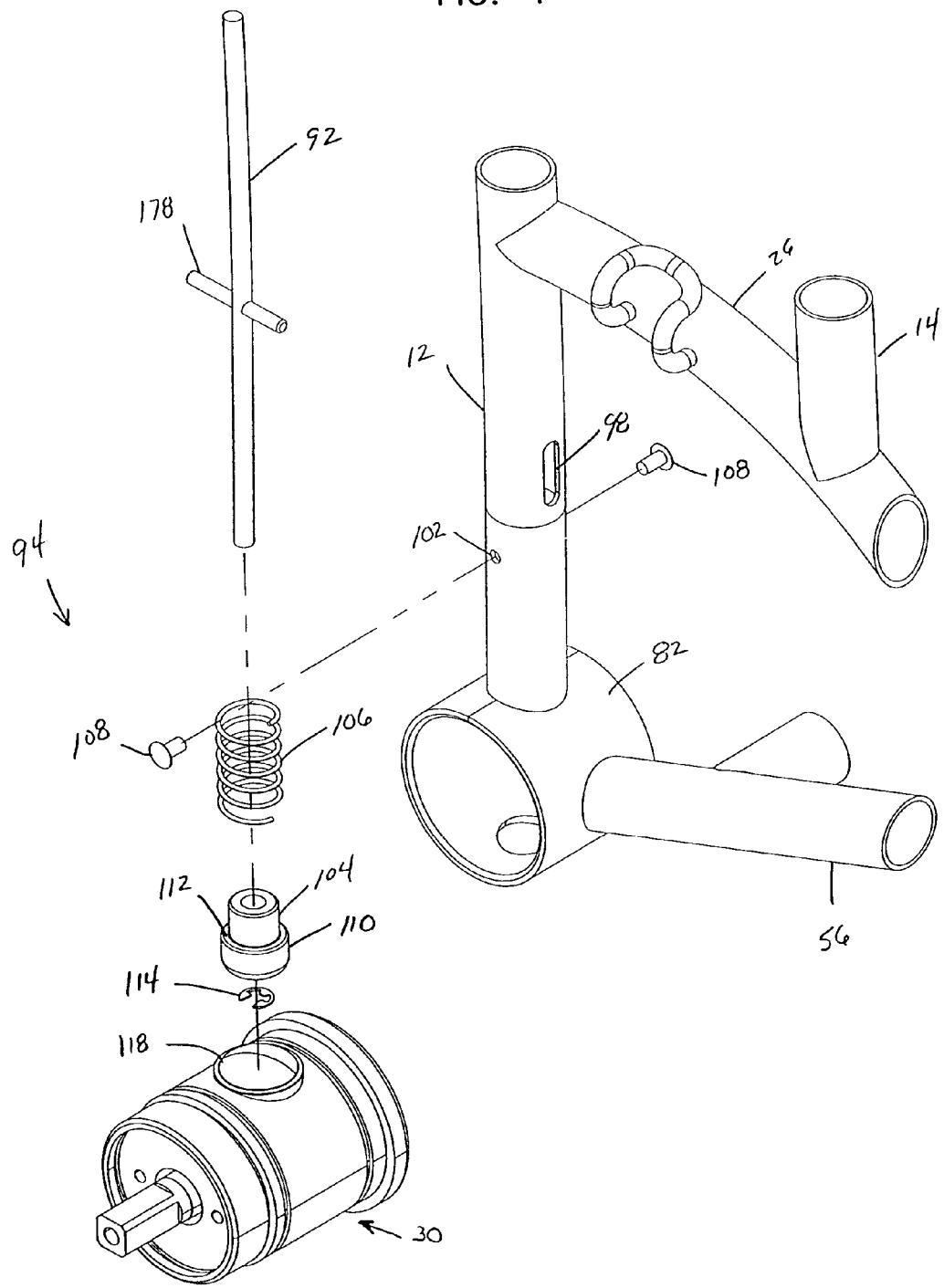
FIG. 4 is an exploded perspective view of the brake assembly and an actuation assembly of FIG. 1.

The brake assembly 30 is engaged and disengaged by operation of an actuation assembly. Referring now to FIG. 4, one embodiment of the actuation assembly 94, in accord with the present disclosure, is illustrated. As can be understood, the illustrated cart 100 includes first and second actuation assemblies 94 corresponding to the first and second brake assemblies 30. Each of the actuation assemblies 94 is positioned within the hollow construction of the rearward upright support members 12.

The actuation assembly 94 includes an actuation or brake rod 92, a spring 106, and a brake rod center piece 110. The brake rod center piece 110 is secured to the brake rod 92 by a retaining ring or clip 114 and positioned so that an end portion 116 of the brake rod 92 extends beyond the brake rod center piece 110 (FIG. 5). The brake rod center piece has a main portion 104 and a shoulder 112. As shown in FIG. 5, the spring 106 is positioned on the outer diameter of the main portion 104. Fasteners 108 (e.g. rivets) are mounted within corresponding holes 102 formed in the rearward upright support members 12. The fasteners 108 are positioned to preload the spring against the shoulder 112 of the brake rod center piece 110. When the actuation assembly 94 is assembled within the rearward upright support members 12, the brake rod center piece 110 centers the end portion 116 of the brake rod 92 with the input location 84 (FIG. 2) of the brake assembly 30.

FIG. 5 illustrates the actuation assembly 94 in relation to the brake assembly 30. A target or brake actuation button 118 is located adjacent to the input location 84 of the brake assembly 30. When the target 118 is depressed by contact with the end portion 116 of the brake rod 92, the brake assembly 30 engages the axle 86 to provide braking action. When the target 118 is released, the end portion 116 of the brake rod 92 is moved upward off the target 118 and the brake assembly disengages the axle 86 to permit free rotation.

Figure 13:
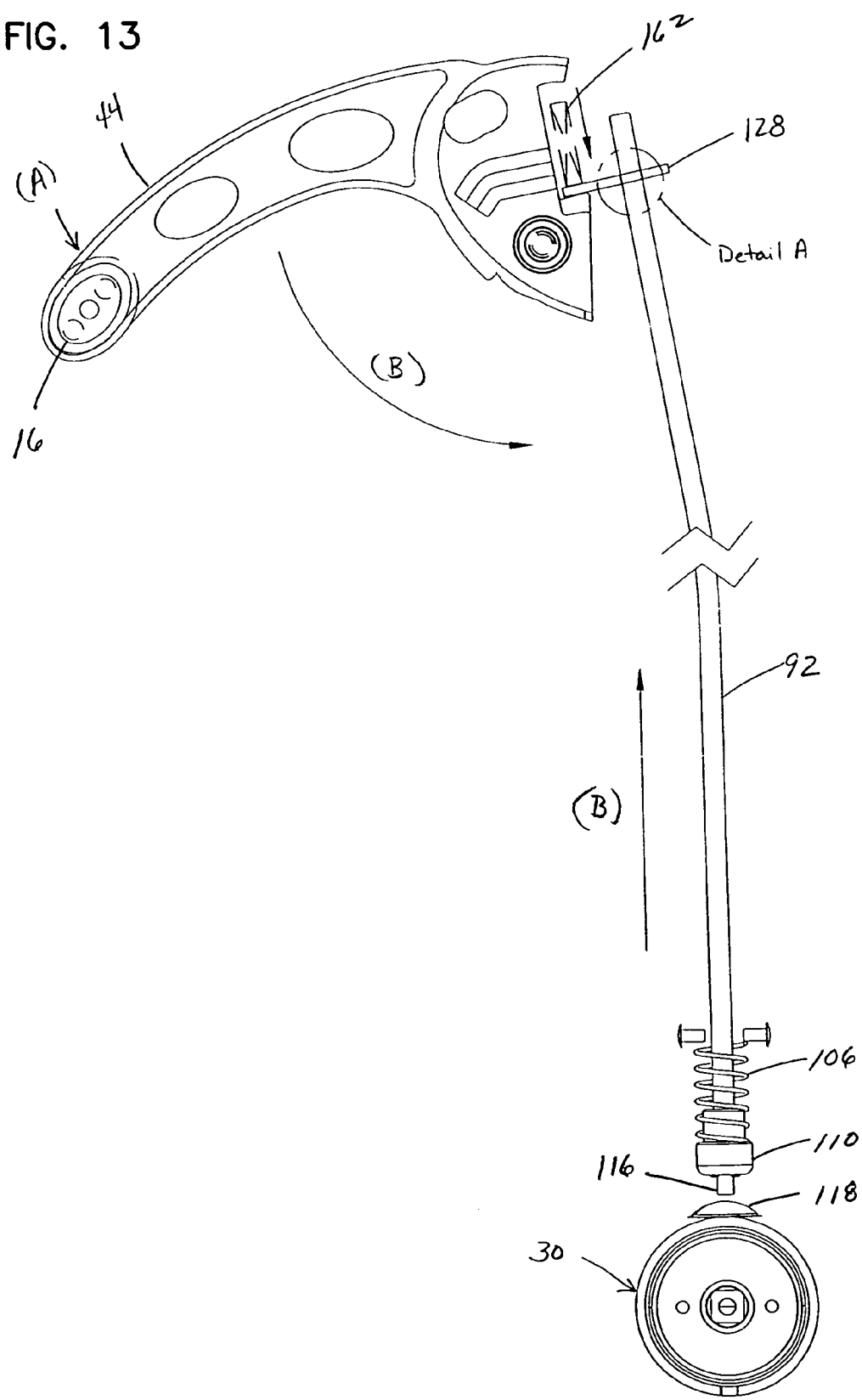
FIG. 13 is a side elevational view of the actuation assembly and brake control mechanism of FIG. 5.

Still referring to FIG. 5, the actuation assembly 94 is shown in relation to the brake control mechanism 20. The brake rod 92, residing within the rearward upright support members 12, interconnects the actuation assembly 94 and the brake control mechanism 20. As can be seen in FIG. 1, the rearward upright support members 12 can be slightly curved. The brake rod 92 can also be slightly curved or angled to correspond to the rearward upright support members 12 (FIG. 13).

The brake control mechanism 20 of the present disclosure generally includes a first compression spring 122, a first catch 126, and a lift wire 130. The first catch 126 includes an aperture 192 through which the brake rod 92 is positioned. The first catch 126 is located adjacent to the lift wire 130. The first compression spring 122 biases the first catch 126 downward on the lift wire 130.

When the handle 16 is released, the catch 126 is oriented generally perpendicular to the brake rod 92. The first compression spring 122 assists to bias and maintain the first catch 126 in this release position (represented as 126(A)).

The lift wire 130 of the brake control mechanism 20 is arranged and configured to move in concert with the handle 16. As the handle 16 is depressed, the lever arm 44 causes the lift wire 130 to pivot. Specifically, as the handle 16 is depressed, the lever arm 44 rotates around the pivot joint 134, which pivots the lift wire 130 from a position shown as 130(A) in FIG. 6, to a position shown as 130(B).

When the handle 16 is depressed, the force from the pivoting action overcomes the bias of the first spring 122, and the lift wire 130 pivots causing the first catch 126 to pivot. In particular, as the lift wire 130 pivots from a release position 130(A) to a depressed position 130(B), the catch 126 likewise pivots from the release position 126(A) to a depressed position 126(B). During rotation of the handle 16, the plane of the catch 126 moves from a position that is generally perpendicular to the axis of the rod 92 to a position that is cocked or non-perpendicular to the axis of the rod 92. When the catch 126 cocks in this matter, edges 124 of the aperture 192 bind or catch on the outer diameter of the brake rod 92. This causes the first catch 126 to bind or catch in a fixed relation or interference with the brake rod 92. Continued rotation of the handle 16 further pivots the lift wire 130, thereby lifting both the first catch 126 and the bound brake rod 92. In one embodiment, the catch 126 causes the brake rod 92 to move upward a distance d1 of between 0.25 inches and 0.5 inches; preferably the catch 126 moves the brake rod 92 upward a distance d1 of approximately 0.325 inches. As the brake rod 92 moves upward, the end portion 116 (FIG. 5) of the brake rod 92 lifts off the target 118, represented by arrow (B), thereby disengaging the brake assembly 30.

Figure 7:
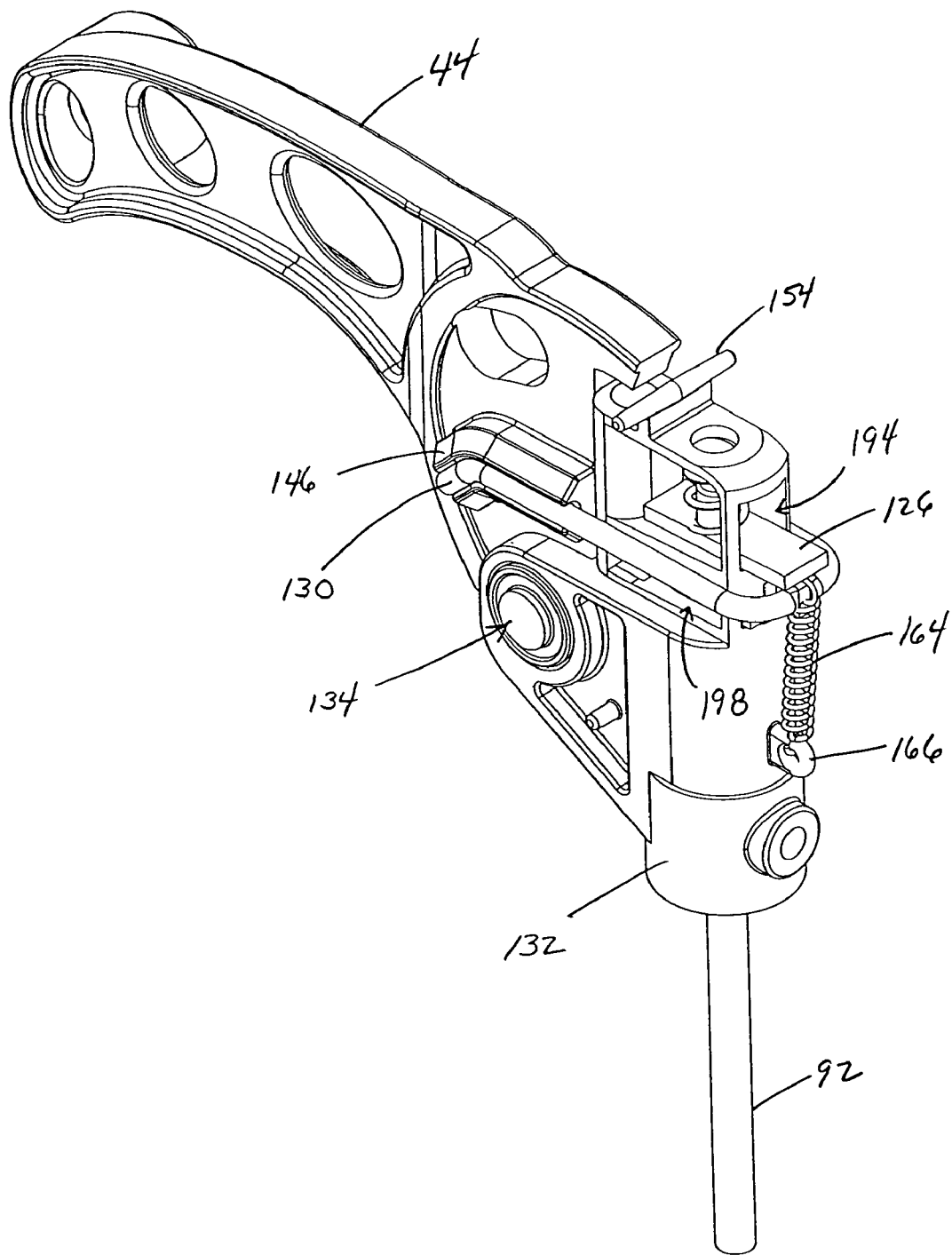
FIG. 7 is a perspective view of the brake control mechanism of FIG. 5.
Figure 8:
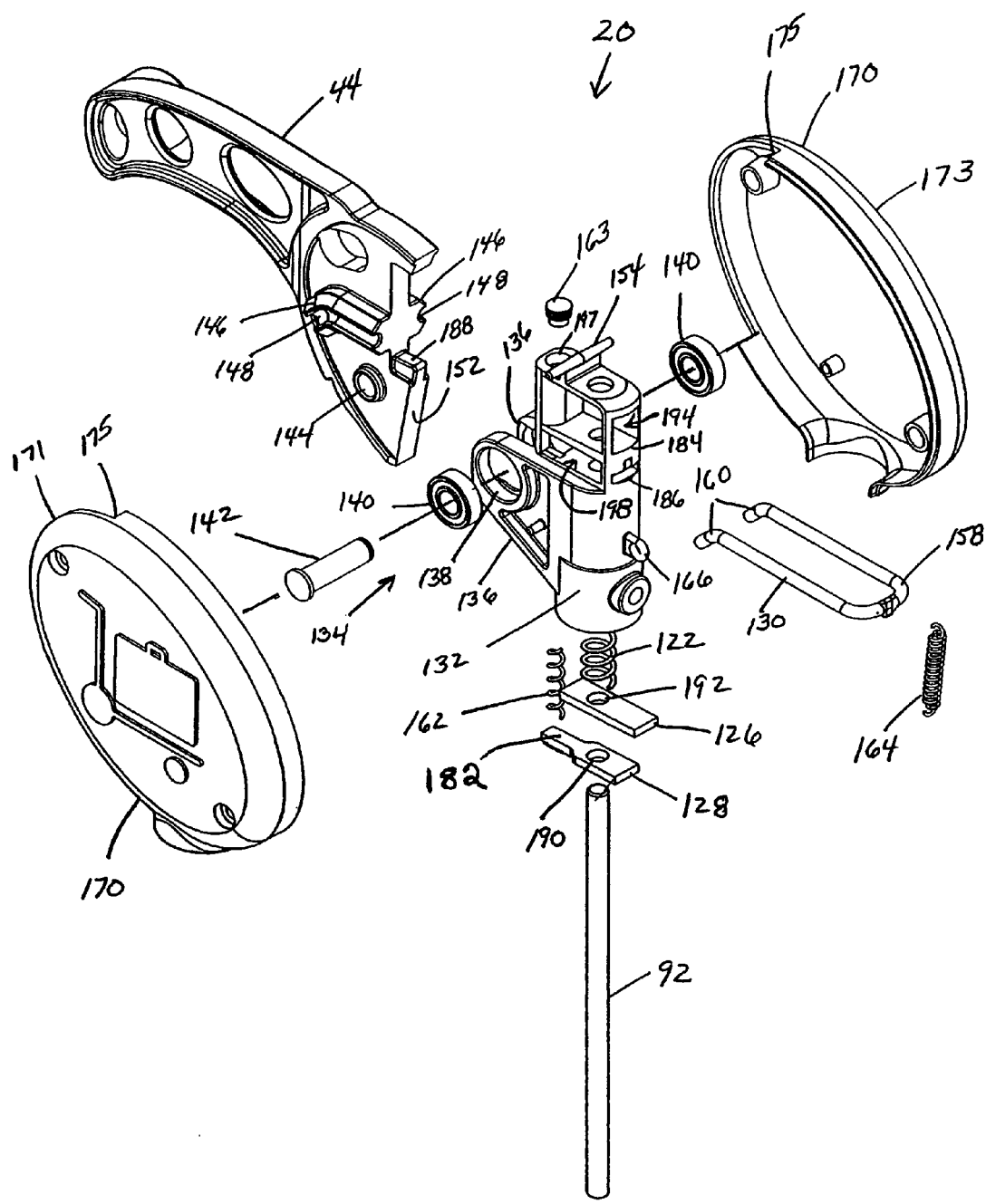
FIG. 8 is an exploded perspective view of the brake control mechanism of FIG. 7.
Figure 9:
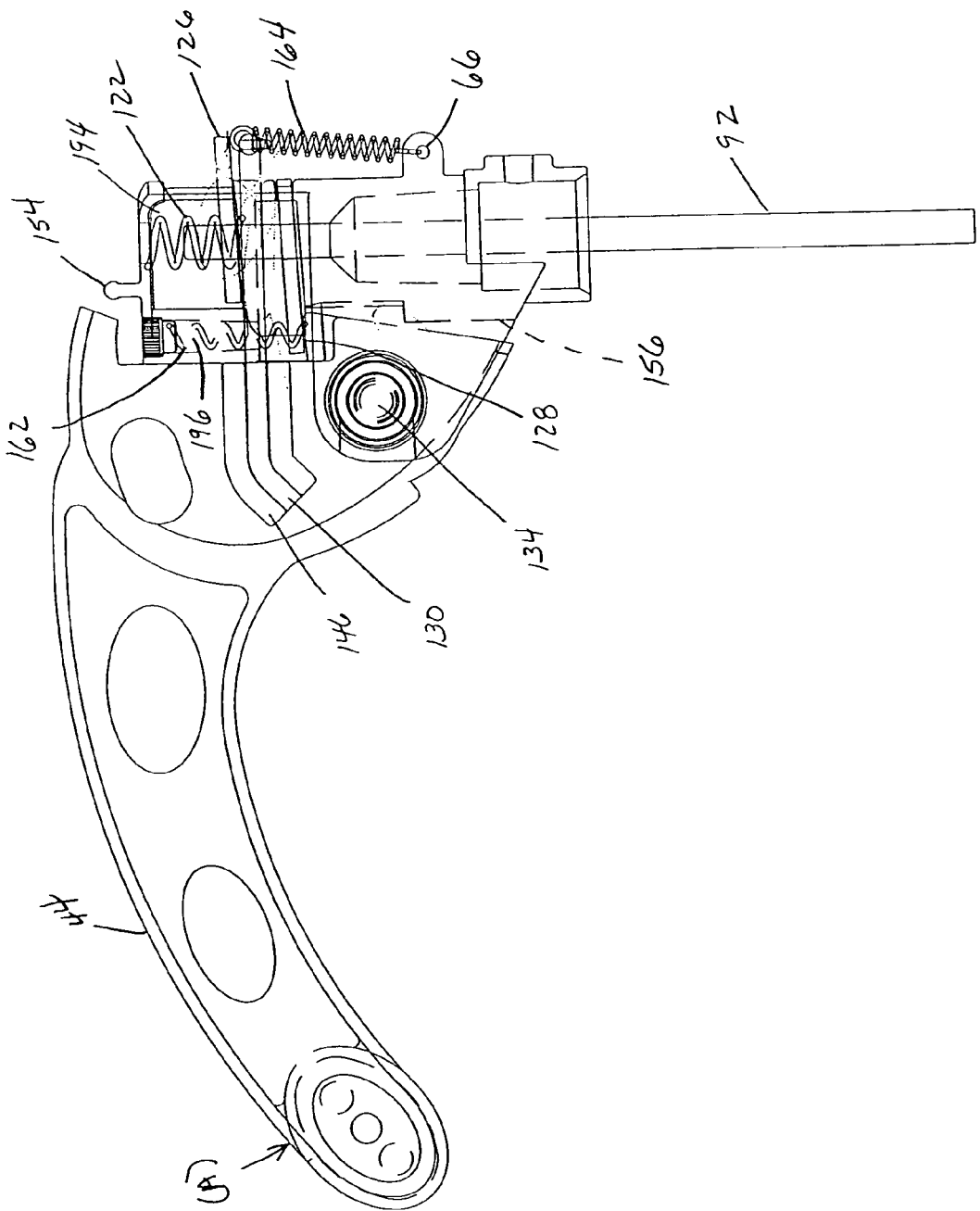
FIG. 9 is a side elevational view of the brake control mechanism of FIG. 7.

Referring now to FIGS. 7-9, the brake control mechanism 20 includes a control mechanism housing 132 to which the lever arm 44 of the handle 16 is pivotally connected. A cover 170 is provided to cover and protect the internal components of the brake control mechanism 20. The cover 170 includes a first portion 171 and a second portion 173. A guide pin 154 is formed on the control mechanism housing 132. The guide pin 154 corresponds to guide structure (not shown) formed on each of the first and second portions 171, 173 of the cover, and assists in aligning and joining the portions of the cover 170. When the portions 171 and 173 are joined, a slot 175 is formed through which the lever arm 44 extends. The slot 175 is configured to accommodate the pivoting motion of the lever arm 44.

The lever arm 44 connects to control mechanism housing 132 at a pivot joint 134. The pivot joint 134 includes two flanges 136 extending outward from the control mechanism housing 132. The flanges 136 have apertures 138 sized and configured for receipt of bearings 140. A pin 142 extends through each of the bearings 140 and flanges 136, and an opening 144 in the lever arm 44, to pivotally connect the lever arm 44 to the control mechanism housing 132.

As show in FIGS. 8 and 9, the lever arm 44 includes holding structure 146 located on either sides of the lever arm. The holding structure 146 is configured for receipt of each of the free ends 160 of the lift wire 130. In the illustrated embodiment the holding structure 146 includes a pair of grooves 148 within which the free ends 160 of the lift wire 130 are positioned and securely held. Other types of structure that fixedly retain the lift wire 130 in relation to the lever arm 44 can be used.

Still referring to FIG. 8, the lever arm 44 also includes a contact surface 152. The contact surface 152 of the lever arm 44 is configured to contact a surface 156 (FIG. 9) of the control mechanism housing 132. The contact surface 152 of the lever arm 44 and the stop surface 156 of the control mechanism housing 132 are configured to limit rotation of the handle 16. Referring back to FIGS. 5 and 6, the handle 16 and lever arm 44 are configured to rotate downward to the depressed position (B) oriented at an angle D from the released position (A). Preferably the handle 16 (and the lever arm 44) has a limited angle of rotation D between 8 degrees and 15 degrees; more preferably the angle of rotation is limited to approximately 12 degrees.

Still referring to FIG. 8, the illustrated brake control mechanism 20 also includes a second catch 128, a second compression spring 162, and a third extension spring 164. The third extension spring 164 is coupled between a closed end 158 of the lift wire 130 and a connection 166 located on the control mechanism housing 152. The third expression spring 164 acts to bias the closed end 158 of the lift wire 130 downward, thereby biasing the free ends 160 of the lift wire 130 upward. Because the free ends 160 of the lift wire 130 are secured within the grooves 148 of the holding structures 146 on the lever arm 44, the extension spring 164 also acts to bias lever arm 44 and handle 16 toward the upward release position (A). FIGS. 7 and 9 illustrate the lever arm in release position (A).

As best shown in FIG. 9, while the third extension spring 164 is biasing the first end 158 of the lift wire 130 downward, the first compression spring 122 also acts to bias first catch 126 and the lift wire 130 downward. The second catch 128 and the second compression spring 162 operate to release the brake assembly 30, as will be discussed in greater detail hereinafter.

The control mechanism housing 132 defines a number of chambers or regions sized, arranged, and configured to operably connect the brake control mechanism's components. In particular, the housing 132 includes: a first region 194 (FIGS. 7 and 8) at which the first catch 126 and the first compression spring 122 are positioned; a second region 196 (FIG. 9) within which the second compression spring 162 is positioned; and a third region 198 (FIGS. 7 and 8) within which the second catch 128 is positioned. The second region 196 extend into the third region 198 to provide interaction between the second compression spring 162 and the second catch 128, as will be described in greater detail hereinafter. A cap 163 (FIG. 8) is secured to an opening 197 of the second region 196 to contain and preload the second compression spring 162. The housing 132 further defines a first opening 184 positioned adjacent to the first region 194 through which an end of the first catch 126 extends, and a slotted opening 186 positioned adjacent to the second region 196 through which the second catch 128 extends.

Referring back to FIG. 10, it is desirable to transport multiple carts in a nested group, and/or to nest a plurality of carts within a vending system or island 200. As previously discussed, when the handles 16 of the carts 100 are not depressed, the brake assemblies 30 prevent rotation of the rear wheels 18. In the present disclosure, the carts are not configured such that the handles 16 are depressed when engaged in a nested group. In accordance with the present disclosure, a brake release device 96 is provided to disengage the brake assemblies 30 when the cart is nested.

FIGS. 10-14 illustrate one embodiment of the brake release device 96. As the carts are nested, the trailing cart 100b engages the brake release device 96 of a leading cart 100a. The brake release device 96 causes the actuation assembly 94 (FIG. 5) to disengage from the brake assembly 30, thereby permitting rotation of the rear wheels 18 for transport. As described in greater detail hereinafter, the brake assembly 30 remains disengaged until the brake control mechanism 20 is reset by depressing and releasing the handle 16.

Figure 11:
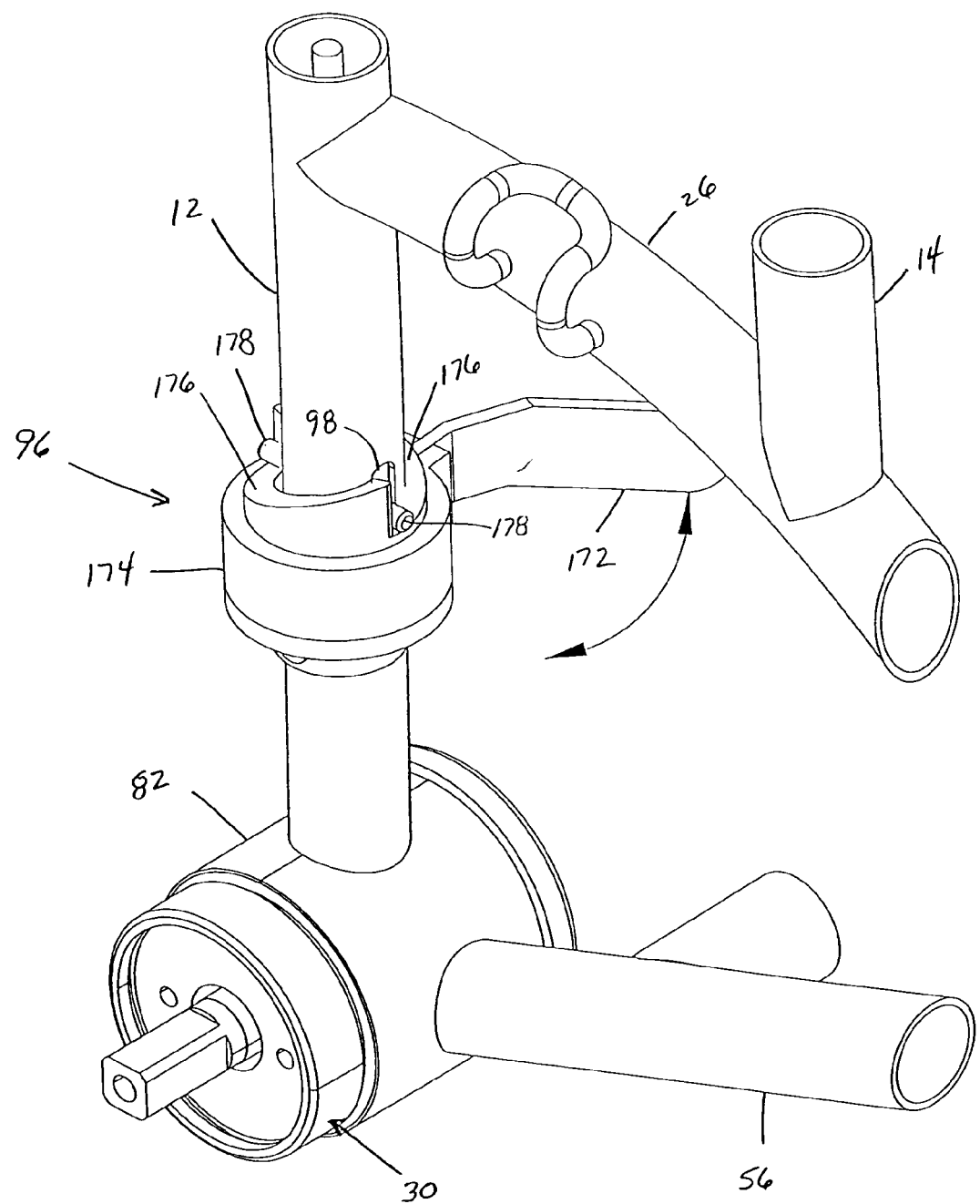
FIG. 11 is a perspective view of the brake assembly and a brake release device of FIG. 1.

Referring to FIG. 11, the brake release device 96 is positioned adjacent to the lower portion 54 of at least one of the rearward upright support member 12. The brake release device 96 generally includes an engagement lever 172 connected to a housing 174. The housing 174 includes an inclined plane or cam surface 176.

The position of the brake release device 96 at the rear end 36 of the cart 100 provides several advantages. One advantage relates to the timing of brake release in nesting operations. Conventional cart designs incorporating braking devices often require a trailing cart to depress the handle of a leading cart to disengage the braking device. In this design, the trailing cart needs to be almost completely placed or nested within the leading cart before the braking device is disengaged.

Another design uses a cable interconnected to and activated by a device located near the caster wheel. In this design, again, the trailing cart needs to be almost completely nested within the leading cart before the braking device is disengaged.

In the present brake release device arrangement, the brake assembly 30 is disengaged when the trailing cart 100b contacts the engagement lever 172 of the leading cart's brake release device 96. The cart need only be partially nested to disengage the brake assembly 30. In addition, the brake release device 96 is designed so that the trailing cart can initially engage the leading cart at an angle and still contact the engagement lever 172 to disengage the brake assembly 30. Thereby precise placement of the cart 100 is not necessary to disengage the brake assembly 30, permitting a user some variance in nested placement. Because the brake assemblies 30 of the leading carts are more quickly disengaged than in conventional designs, a user can more quickly move the carts together in a tight nested group, and more quickly transport the nested group.

Further, some conventional designs requiring almost complete nesting to disengage the braking devices can cause transport problems if one or more of the carts being transported become partially separated and lock up when the brakes engage. In the present disclosure, spatial separation between nested carts during transport does not cause the brake assembly 30 to lock up.

Figure 12:
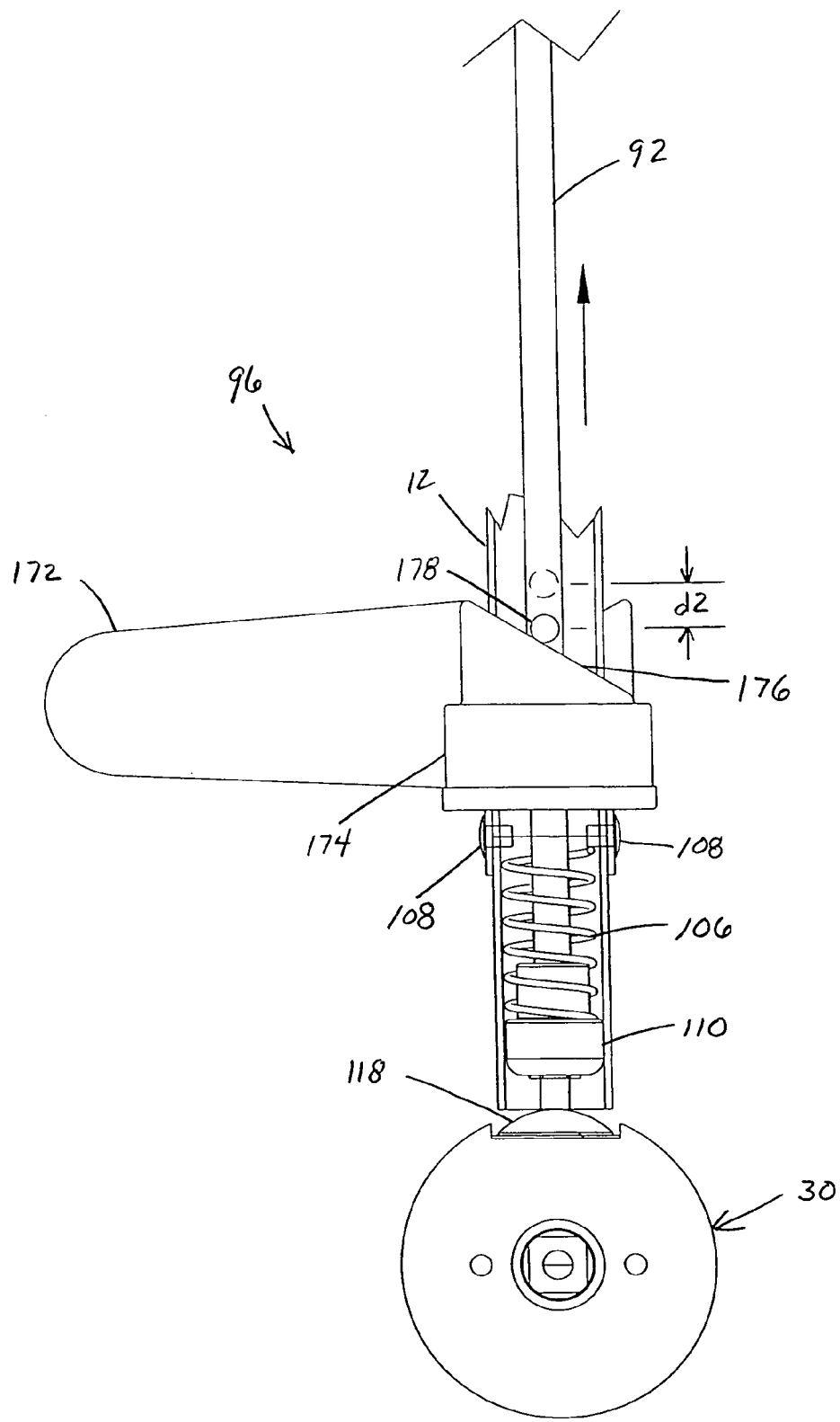
FIG. 12 is a side elevational view of the brake release device of FIG. 11.

Referring back to FIG. 4, a lift pin or dowel 178 is secured to the brake rod 92 at a positioned in relation to the brake release device 96 (see also FIG. 12). When a trailing cart 100b (FIG. 10) is not nested or engaged with a leading cart 100a, the engagement lever 172 of the brake release device 96 extends inward towards the center of the cart frame 10 (see also FIG. 1). Referring still to FIG. 10, when a trailing cart 100b engages the leading cart 100a, the engagement lever 172 rotates forward, as shown by the arrow in FIGS. 10 and 11. Rotation of the engagement lever 172 is caused by contact from the cross support member 26 of the trailing cart 100b.

Referring to FIG. 11, when the housing 174 rotates, the lift pin 178 rides upward along the cam surface 176 to lift the brake rod 92 upward. The pin 178 extends out through slots 98 formed in the hollow construction of the rearward upright support members 12. The slots 98 are configured and oriented to accommodate the upward movement of the lift pin 178. In the illustrated embodiment, the housing 174 includes two cam surfaces 176 upon which the opposite ends of the lift pin 178 engage.

As shown in FIG. 12, the lift pin 178 and brake rod 92 are lifted upward a distance d2. In one embodiment, the lift pin 178 and brake rod 92 are lifted upward a distance d2 of between 0.350 inches and 0.500 inches; preferably the lift pin 178 and brake rod 92 are lifted upward a distance d2 of approximately 0.400 inches. As the brake rod 92 moves upward, the end portion 116 (FIG. 5) of the brake rod 92 lifts off the target 118, thereby disengaging the brake assembly 30.

Figure 13A:
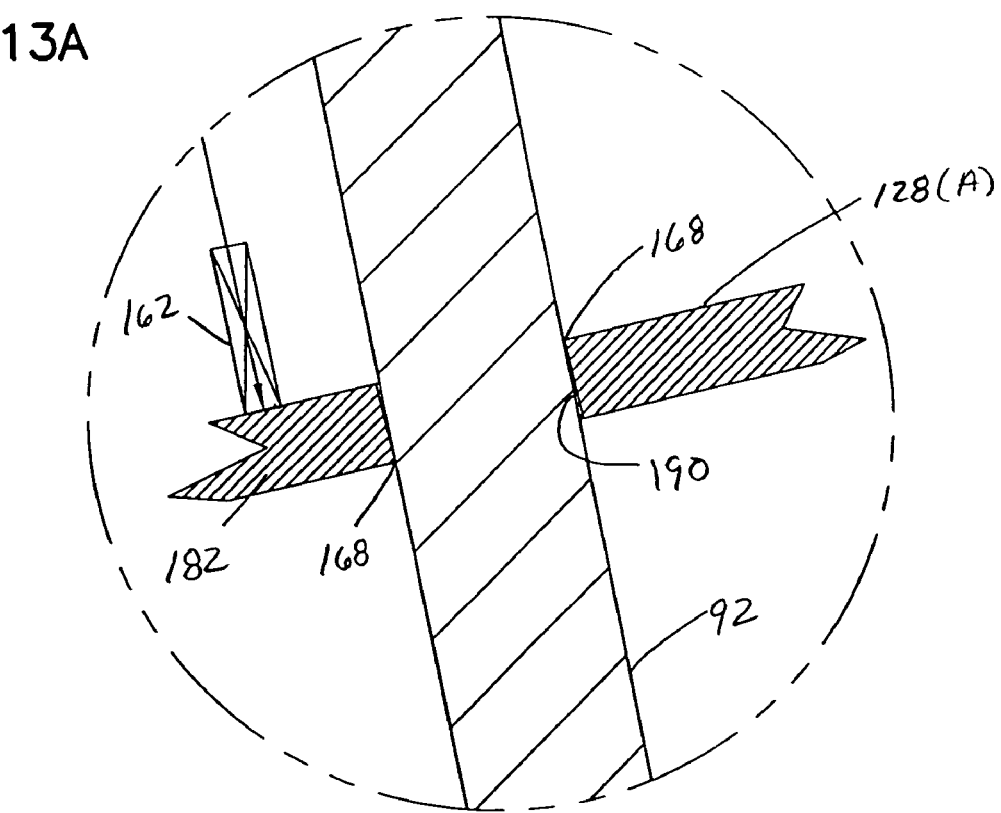
FIG. 13A is a detail view of FIG. 13.
Figure 14:
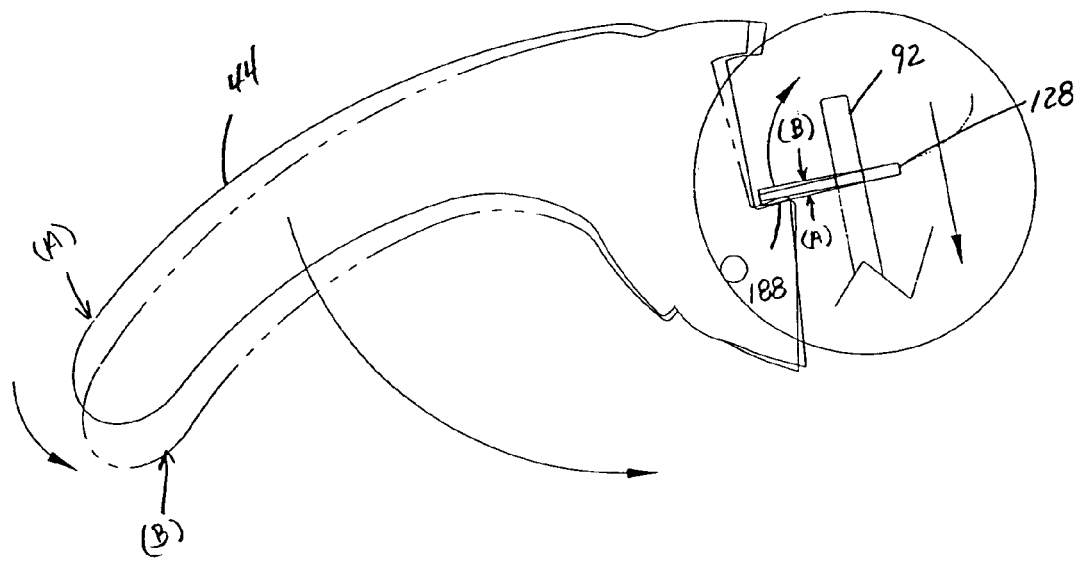
FIG. 14 is a schematic representation of the brake control mechanism of FIG. 13.

Referring now to FIGS. 13-14, operation of the second catch 128 with respect to operation of the brake release device 96 is illustrated. The second catch 128 includes an aperture 190 through which the brake rod 92 is positioned. When the handle 16 is released, position (A), the second catch 128 of the brake control mechanism 20 is biased downward on one end 182. As shown best in FIG. 13A, the second compression spring 162 causes edges 168 of the aperture 190 of the catch 128 to bind or catch on the brake rod 92. Thus, when the handle 16 in is a release position, the second catch 128 binds on the brake rod 92 preventing downward movement of the brake rod 92.

Figure 14A:
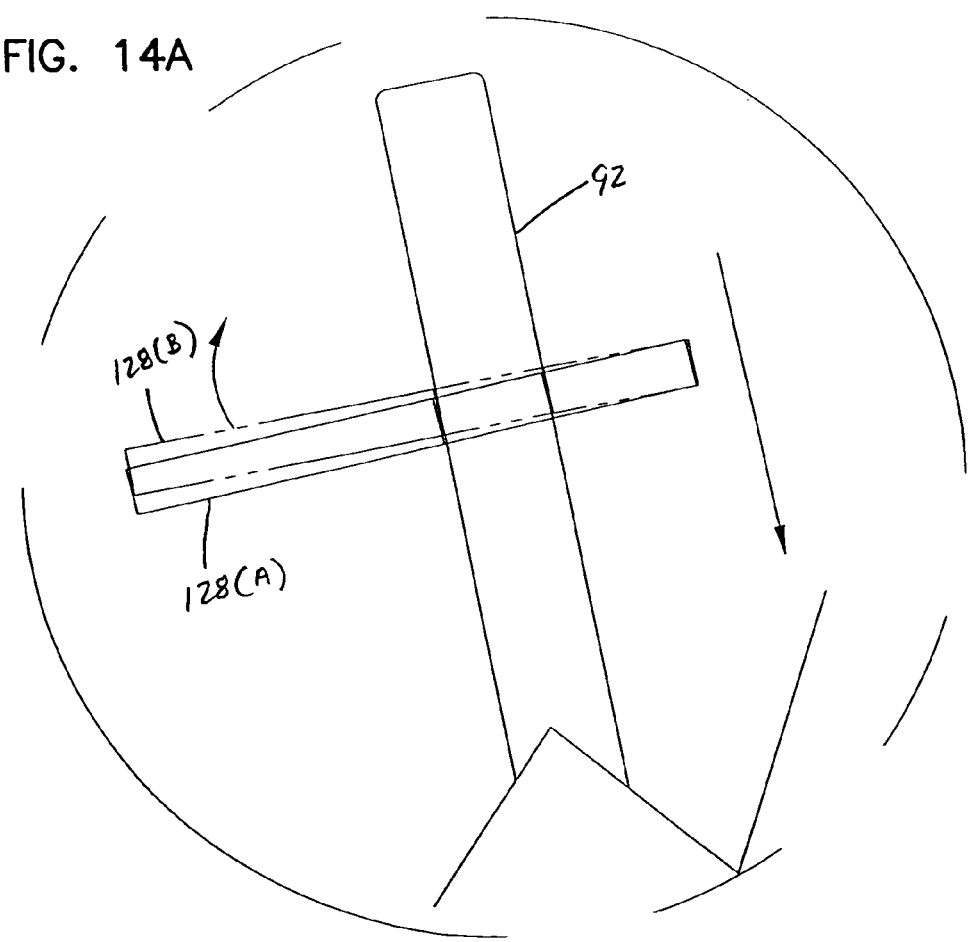
FIG. 14A is a detail view of FIG. 14.

Referring now to FIG. 14, when the handle is depressed, a portion 188 of the lever arm contacts the one end 182 of the second catch 128. The upward force caused by the portion 188 of the lever arm is sufficient to overcome the biasing force of the second compression spring 162. As shown in FIGS. 14 and 14A the upward force from the portion 188 of the lever arm shifts the second catch 128 upward to a position (B) generally perpendicular with the brake rod 92. In position (B), the brake rod 92 is free to move up or down within the aperture 190 of the second catch 128. As previously described, when the handle is further rotated, the lift wire 130 (FIG. 6) pivots to engage the first catch 126. By this arrangement, the lever arm 44 acts to both un-bind the second catch 128 and bind the first catch 126 when the handle 16 is depressed. This action occurs in a substantially simultaneous period of time.

When the brake rod 92 is lifted upward by the cam surfaces 176 of the brake release device 96, and the handle 16 is in the released position, the second catch 128 is oriented to bind with the brake rod 92, as shown in FIG. 13A. The force of the cam surface acting on the lift pin 178 (FIG. 12), however, is sufficient enough to overcome the frictional force caused by the binding engagement of second catch 128 and the brake rod 92. Thus, the brake rod 92 slides through the aperture 190 in the second catch 128 when the brake release device 96 is rotated, even though the second catch 128 is bound.

It is to be understood that the frictional forces caused by the second catch 128 can be modified by incorporating a compression spring having of a different strength, thereby providing a greater or lesser spring force and modifying the frictional force between the second catch 128 and the brake rod 92. The extension spring 164 can likewise be modified to change the frictional force between the first catch 126 and the brake rod 92.

When a cart is removed from a nested group of carts and the handle has not yet been moved, a return spring (not shown) contained within the housing 174 of the brake release device 96 returns the engagement lever 172 and the housing 174 of the brake release device 96 to their original positions. When this occurs, the second catch 128 is still engaged and binding on the brake rod 92 to hold the brake rod 92 up from the brake assembly target 118. The brake assembly 30 is thereby still disengaged and the cart is free to roll.

To re-engage the brake assembly 30, the handle 16 is depressed to reset the brake control device 20. In particular, depressing the handle 16 causes the portion 188 of the lever arm 44 to shift the second catch 128 to the position (B) generally perpendicular to the brake rod 92 (FIG. 14). At substantially the same time, the first catch 126 binds on the brake rod 92, as previously described. When the handle 16 is subsequently released, the brake control mechanism 20 and the brake rod 92 are "re-set" to the release position (A). When the brake rod 92 moves downward, i.e. the handle is released, the end portion 116 (FIG. 5) of the brake rod 92 contacts the target 118, thereby engaging the brake assembly 30. The first compression spring 122 and the compression spring 106 of the actuation assembly 96 assist in biasing the brake rod 92 downward.

Referring now to FIGS. 15-30, a second embodiment of a wheeled cart 300 is illustrated. As shown in FIG. 15, the second embodiment of the wheeled cart 300 also includes a brake assembly 230 and a brake control mechanism 220. In use, the brake assembly 230 is normally engaged when a handle 216 of the cart 300 is released, that is, the brake assembly prevents or inhibits the cart from rolling when the handle is not rotated. When the handle 216 is rotated (i.e.

depressed or pushed downward, or raised or lifted upward), the brake assembly 230 is disengaged and the cart 300 is permitted to roll.

The second embodiment of the present invention includes the advantages as discussed with regards to the previous embodiment. For example, the brake assembly 230 is normally engaged when the cart 300 is left unattended; the brake assembly 230 does not interact with the surface of the wheel 218 when braking; and brake performance is not affected by sand, moisture, or other damaging contaminants that are airborne or would be picked up by the tire tread. Also, the brake assembly 230 does not interfere with existing guided wheel slots of rental-return stations 200 (FIGS. 3 and 17), provides braking action in both the forward and reverse directions; and is configured and arranged for easy replacement and maintenance.

The basic frame construction of the cart 300 is similar in configuration to that of cart 100 described with respect to the first embodiment of the invention. The cart 300 illustrated in FIG. 15 includes a frame 210 generally having a front end 234 and a rear end 236. The frame 210 includes first and second rearward upright support members 212 extending upward from a sleeve joint 282 (FIG. 16). The first and second rearward upright support members 212 have a hollow tubular construction (shown in FIG. 18). A lower platform 224 extends forward from the sleeve joints 282. Rear wheels 218 are oppositely positioned toward the rear end 236 of the cart 300. A front rotatable caster 222 that permits the cart to turn is mounted to the lower platform 224 toward the front end 234 of the cart 300.

Still referring to FIG. 15, the handle 216 is operably coupled to each of the rearward upright support members 212 to manually control operation of the brake assembly 230 and transport of the cart 300. In particular, the handle 216 is interconnected to first and second brake control mechanisms 220 by first and second lever arms 244. The first and second brake control mechanisms 220 are positioned adjacent to an upper portion 252 of the rearward upright support members 212.

The brake control mechanisms 220 operate to engage and disengage the brake assemblies 230. When the handle 216 is released, represented by the handle position shown in FIGS. 15 and 21, the brake assemblies 230 are normally engaged and prevent rotation of the rear wheels 218. When the handle 216 is rotated, as shown in FIGS. 22 and 23, the brake assemblies 230 become disengaged and permit free rotation of the rear wheels 218.

Still referring to FIG. 15, the frame 210 further includes forward upright support members 214 and cross support members 226. The forward upright support members 214 are connected to the upper portion 252 of the rearward upright support members 212 and the cross support members 226. The cross support members 226 are connected to a lower portion 254 of the rearward upright support members 212 and the lower platform 224. In the illustrated embodiment the cross support members 226 have an arcuate shape.

The lower platform 224 of the frame 210 extends forwardly from the rearward upright support members 212. In the illustrated embodiment, the lower platform 224 includes an outer lower support member 256 and an inner lower support member 258.

In the illustrated embodiment, the outer lower support member 256 has a U-shape configuration. The outer lower support member 256 is arranged to extend from the sleeve joint 282. Similar to the previous embodiment, the outer lower support member 256 is oriented so that cargo placed on the lower platform 224 is oriented or angled upward from horizontal to prevent the cargo from falling forward off the cart 300. Cushioned side rollers 270 are secured to the outer lower support member 256 at the front end 234 of the cart 300. The side rollers 270 protect the cart and other objects from damage caused by any impact that may occur during use.

The inner lower support member 258 is connected to, and positioned centrally inward from, the outer lower support member 256. In the illustrated embodiment, the inner lower support member 258 also has a U-shape configuration. A mounting bracket 260 (also partially shown in FIG. 24) is coupled to the inner lower support member 258 toward the front end 234 of the cart 300. The front caster 222 (FIG. 15) is mounted to the cart 300 at the mounting bracket 260.

Still referring to FIG. 15, the frame 210 further includes transverse supports. In particular, first and second transverse bars 264, 266 are positioned to structurally support the rearward upright support members 212. A transverse lower support member 262, located near the front end 234 of the cart 300, is interconnected to the outer lower support member 256. The transverse lower support member 262 structurally supports the lower platform 224. In addition, the traverse lower member 262 is configured such that during nesting operation, the traverse lower support member 262 of a trailing cart (e.g. 300*b* shown in FIGS. 24 and 25) rides upon on the inner lower support member 258 of a leading cart 300*a*. The trailing cart 300*b* is thereby lifted upward so that the front caster 222 of the trailing cart 330*b* no longer contacts the ground.

Figure 24:
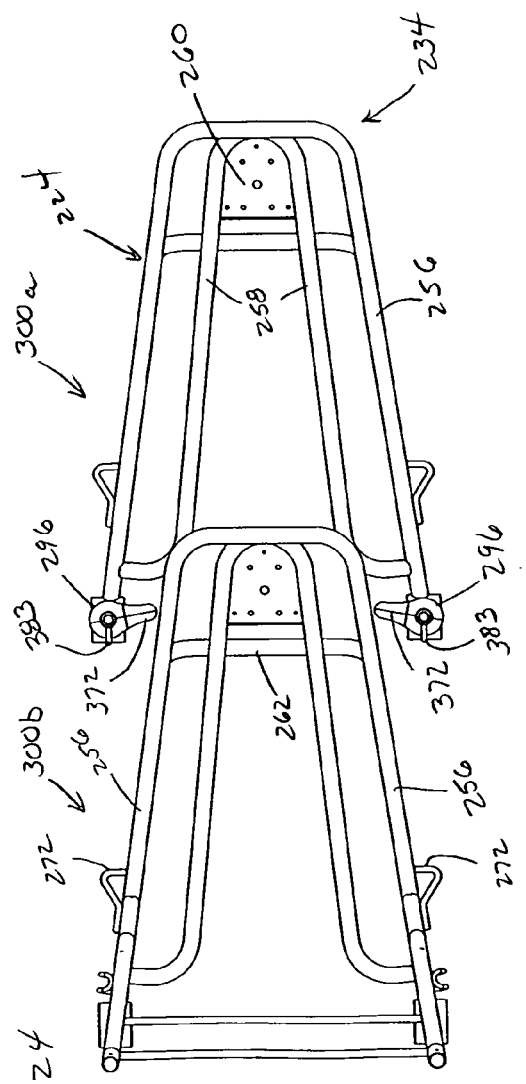
FIG. 24 is a top plan view of a frame of the cart of FIG. 15, shown in part, with a second cart frame, also shown in part.

Still referring to FIGS. 15 and 24, pair of stopping elements 272 is positioned on the outer lower support member 256 of the cart frame 210 to stop forward motion of the trailing cart 300*b*. In particular, the stopping elements 272 of the trailing cart 300*b* engage corresponding stop structures 383 of the leading cart 300*a* so that neither of the carts interferes with the other cart's rear wheels.

During a nested group transport (i.e. transport of a number of nested carts), a rope or cable (not shown) can be hooked and entrained to a loop member 274 (FIGS. 15 and 16) of each cart. The rope or cable can be used to interconnect each of the nested carts of the group to hold the carts together during movement or transport. Similar to the previous embodiment, the wheeled cart 300 also includes a cargo basket 276 mounted to the rearward and forward upright support members 212, 214.

Referring now to FIG. 16, the brake assembly 230 of the second embodiment is fixedly positioned and mounted within the sleeve joint 282 of the frame 210. The brake assembly 230 includes a housing 283 having an input location 284, and a shoulder 288. The shoulder 288 of the housing 283 is configured to position the brake assembly 230 within the sleeve joint 282 such that the input location 284 is aligned with the rearward upright support member 212. A snap ring 213 is used to secure the brake assembly 230 within the sleeve.

The brake assembly 230 is similar in construction and operation to the brake assembly 30 previously described with respect to the first embodiment of the invention. The brake assembly 230 is a wrap-spring type brake assembly including an output member 286 arranged to operate as a wheel axle. The brake assembly 230 functions to engage and disengage the output member or axle 286 to provide braking action. The rear wheel 218 includes a wheel hub 290 configured to couple with the axle 286. A fastener 292 couples the rear wheel 218 to the axle 286.

Referring now to FIG. 17, the second wheeled cart embodiment 300 is also configured for use with standard vending systems or return stations 200. That is, the brake assembly 230 is compatible with existing return stations. In particular, the braking assembly 230 is positioned, and operates, so as to not obstruct the area surrounding the rear wheels 218; so that placement of the rear wheel within a channel 202 of a return station 200 is not hindered.

The brake assembly 230 is engaged and disengaged by operation of an actuation assembly 294. Referring now to FIGS. 18 and 21-23, another embodiment of the actuation assembly 294, in accord with the present disclosure, is illustrated. As can be understood, the illustrated cart 300 includes first and second actuation assemblies 294 corresponding to the first and second brake assemblies 230. Each of the actuation assemblies 294 is positioned within the hollow construction of the rearward upright support members 212.

The actuation assembly 294 includes an brake rod 292, a spring 306, and a brake rod center piece 310. The brake rod center piece 310 is positioned about the brake rod 292. When assembled, the brake rod center piece 310 rests upon the sleeve 282. That is, the hole (not shown) formed in the sleeve 282 through which the brake rod 292 extends is typically less than the inside diameter of the upright support member 212; thereby providing a shoulder upon which the brake rod center piece 310 may rest. In the alternative, the brake rod center piece 310 can be configured with an interference fit so that the center piece 310 is frictionally secured at a position within the support member 212. When the actuation assembly 294 is assembled within the upright support members 212, the brake rod center piece 310 axially centers an end portion 316 of the brake rod 292 in alignment with the input location 284 (FIG. 18) of the brake assembly 230.

Figure 18:
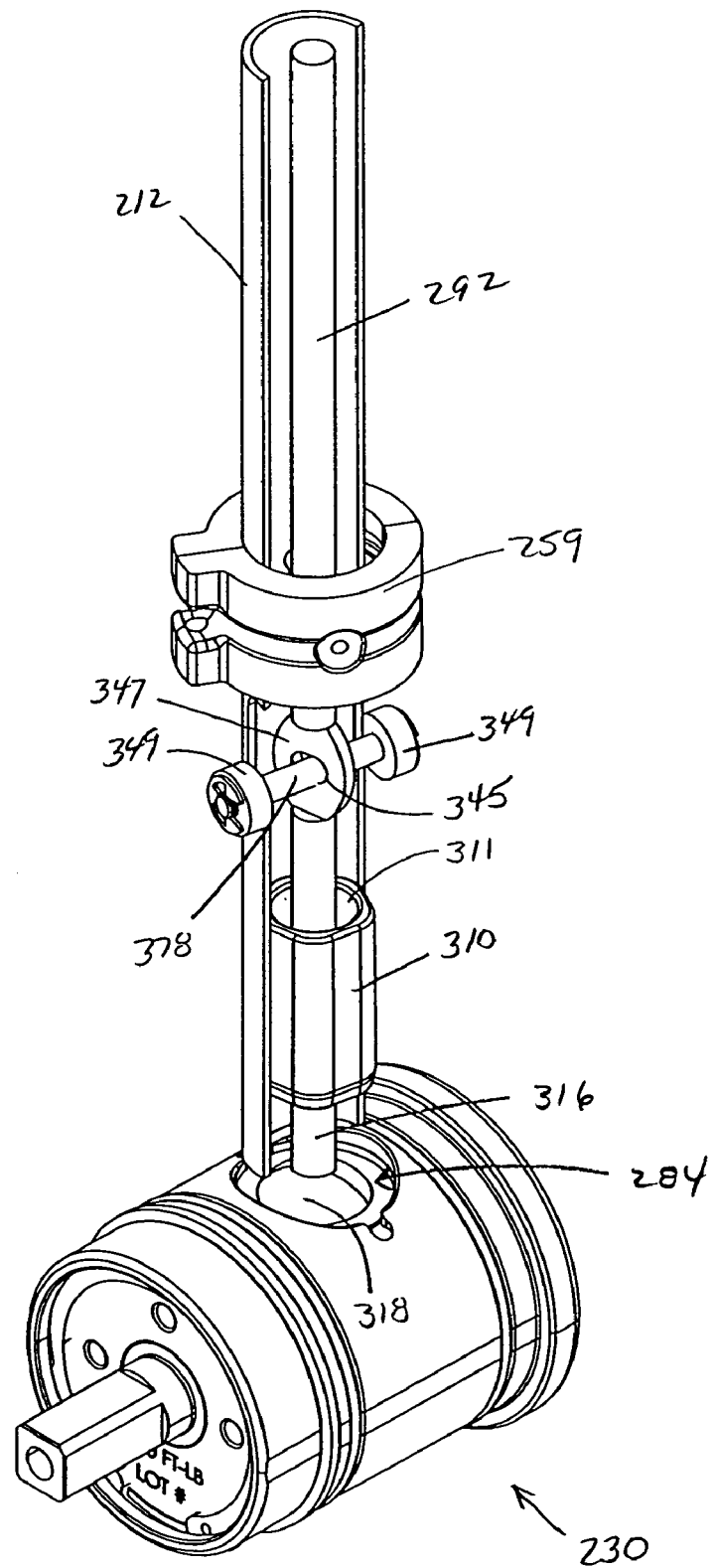
FIG. 18 is a perspective view of the brake assembly and another embodiment of an actuation assembly of the present invention, shown in FIG. 15.

Referring now to FIGS. 21-23, the spring 306 of the actuation assembly 294 is positioned about the outer diameter of the brake rod 292. Tabs 308 are formed on the brake rod 292. The tabs 308 are positioned in relation to the spring 306 so that the spring 306 biases the brake rod 292 toward the brake assembly 230. As shown in FIG. 18, a target or brake actuation button 318 is located adjacent to the input location 284 of the brake assembly 230. When the target 318 is depressed by the end portion 316 of the brake rod 292 (e.g. when the handle 216 is released as shown in FIG. 21), the brake assembly 230 engages the axle 286 to provide braking action. When the target 318 is released (e.g. when the handle 216 is rotated as shown in FIGS. 22 and 23), the end portion 316 of the brake rod 292 moves upward off the target 318 and the brake assembly disengages the axle 286 to permit free rotation.

Still referring to FIGS. 21-23, the actuation assembly 294 is shown in relation to the brake control mechanism 220. The brake rod 292 of the actuation assembly 294 is generally the interconnecting member between and the brake control mechanism 220 and the brake assembly 230.

As shown, the brake control mechanism 220 of the second embodiment includes a control mechanism housing 332. A first compression spring 322, a positioning structure 326 and a lift piece 330 are arranged within the housing 332. The brake rod extends through a spacer 385 also positioned with the housing 332. The spacer 385 operably compresses the spring 306 of the actuation assembly 294 to provide the downward bias upon the brake rod 292.

The positioning structure 326 and the lift piece 330 each includes an aperture through which the brake rod 292 is positioned (only aperture 392 of the lift piece 330 is shown, see FIG. 20). The first compression spring 322 is placed between the positioning structure 326 and fasteners 327 attached to the end of the brake rod 292. In overall operation, the positioning structure 326 in combination with the first compression spring 322 function to return the handle 216 of the cart 300 from a rotated position to a non-rotated position when the handle 216 is released; and the lift piece 330 in combination with the spring 306 function to raise and lower the brake rod 292 to disengage and engage the brake assembly 230.

To disengage and engage the brake assembly, the brake rod 292 is raised and lowered by rotating and releasing the handle 216. When the handle 216 is depressed, for example, the force from the pivoting action of the handle 216 overcomes the bias of the first spring 322, and first and second ends 335, 337 of the lift piece 330 pivot as shown in FIG. 22. As the first end 335 of the lift piece 330 pivots upward, edges 324 (FIG. 20) of the aperture 392 bind or catch the outer diameter of the brake rod 292. That is, the lift piece 330 binds or catches in a fixed relation or interference with the brake rod 292. Continued downward rotation of the handle 216 further pivots the lift piece 330, thereby lifting both the lift piece 330 and the bound brake rod 292. As the brake rod 292 is lifted upward, the end portion 316 (FIG. 22) of the brake rod 292 lifts off the target 318, thereby disengaging the brake assembly 230.

Likewise, when the handle 216 is raised or pivoted upward, the force from the pivoting action of the handle 216 overcomes the bias of the first spring 322, and the first and second ends 335, 337 of the lift piece 330 pivot as shown in FIG. 23. As the second end 337 of the lift piece 330 pivots upward, the edges 324 (FIG. 20) of the aperture 392 bind or catch the outer diameter of the brake rod 292. Continued upward rotation of the handle 216 further pivots the lift piece 330, thereby lifting both the lift piece 330 and the bound brake rod 292 to disengage the brake assembly 230.

In general, the lift piece 330 is arranged and configured to move in concert with the handle 216 (as shown in FIGS. 21-23). That is, when the handle 216 is rotated, the lift piece 330 rotates or pivots accordingly. The first compression spring 322 and the positioning structure 326 bias the lift piece 330 to return the handle 216 of the cart 300 from either of the rotated positions to the non-rotated position when the handle 216 is released.

Referring now to FIG. 20, the first end 335 of the lift piece 330 includes a hooked structure 339 configured to couple to a connection piece 341. The connection piece 341 couples to flanges of the lever arm 244. The positioning structure 326 is located adjacent to the lift piece 330. The first compression spring 322 provides a force that biases the positioning structure 326 to the position shown in FIG. 21. When the handle 216 or lever arm 244 is rotated downward, the first end 335 of the lift piece 330 contacts a first end 331 (FIG. 22) of the positioning structure 326. The spring 322 and positioning structure 326 act to push downward on the first end 335 of the lift piece 330 to return the lever arm 244 back to the released position shown in FIG. 21. Likewise, when the lever arm 244 is rotated upward, the compression spring 322 and an intermediate region 343 (FIG. 23) of the positioning structure 326 act to push downward on the second end 337 of the lift piece 330. This force also biases the lever arm 244 back to the released position shown in FIG. 21.

Figure 19:
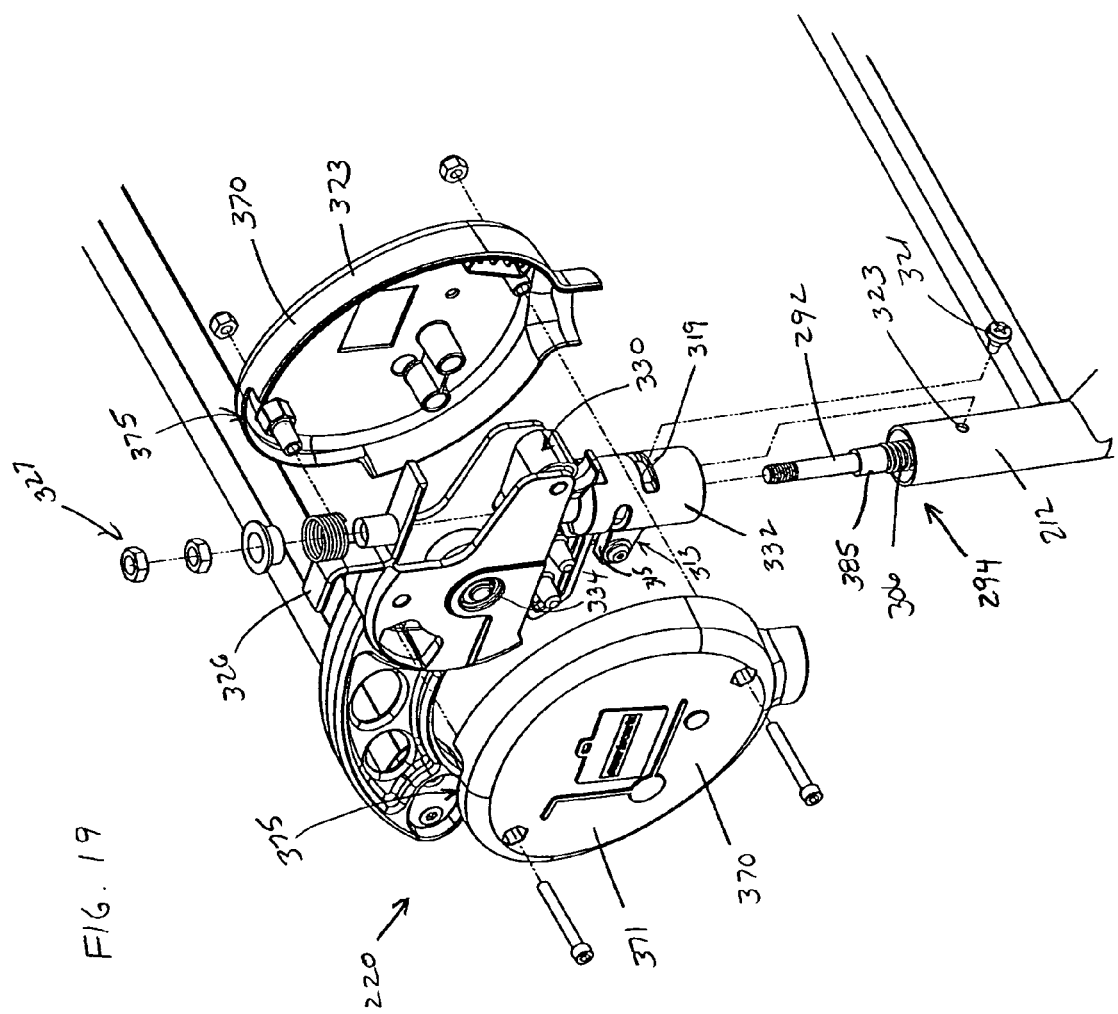
FIG. 19 is an exploded perspective view of the brake control mechanism embodiment of FIG. 15.
Figure 25:
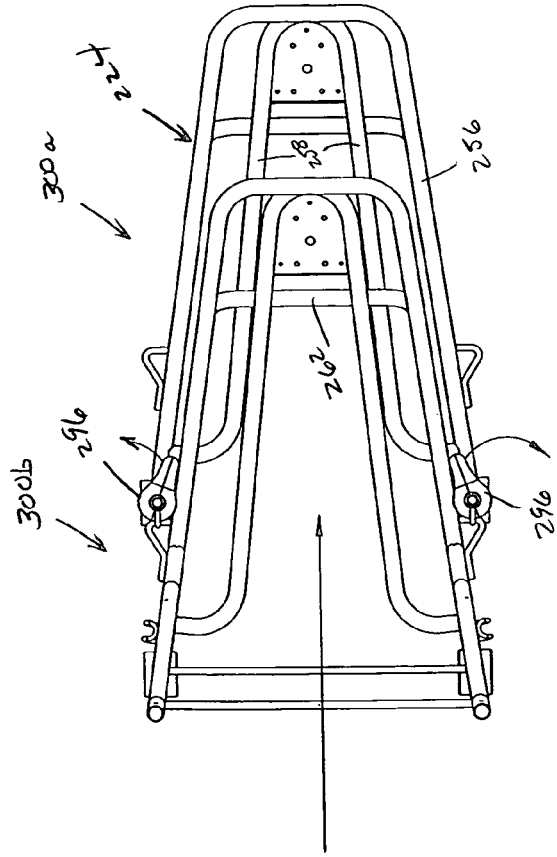
FIG. 25 is a top plan view of the frames of FIG. 24, shown nested.

Referring to FIGS. 19 and 20, the lever arm 244 of the handle 216 is pivotally connected to the housing 332 of the brake control mechanism 220 at a pivot joint 334. The pivot joint 334 includes a pin 342 extend through at least one bearing 340 contained by the housing 332. The pin 342 is secured to the lever arm 244 by snap rings 387.

The housing 332 couples to the support member 212 of the frame 210 by a clamp structure 313. The clamp structure 313 includes first and second flanges 315 (only one shown in FIG. 20) that are clamped together by a fastener 317 to secure the housing 332 to the support member 212. In addition, the housing 332 includes a slot 319 to further secure the housing 332 to the support member 212. As shown in FIG. 19, a set screw 321 is positioned to extend through the slot 319 and into a threaded hole 323 formed in the support member 212. As can be understood, the slot 319 permits for ease of assembly by providing allowable play in the angular orientation of the housing 332 relative to the support member 212.

Still referring to FIG. 19, a cover 370 is provided to cover and protect the internal components of the brake control mechanism 220. The cover 370 includes a first portion 371 and a second portion 373 secured together by fasteners. When the portions 371 and 373 are joined, a slot 375 is formed through which the lever arm 244 extends. The slot 375 is configured to accommodate the pivoting motion of the lever arm 244.

As shown best in FIGS. 21-23, the lever arm 244 includes a contact surface 352 arranged to contact a stop surface 356 of the control mechanism housing 332. The contact surface 352 of the lever arm 244 and the stop surface 356 of the control mechanism housing 332 are configured to limit downward rotation of the handle 216. Likewise, the brake control mechanism 220 includes an arrangement configured to limit the upward rotation of the handle 216 and lever arm 244. In particular, the hooked construction 339 of the lift piece 330 is configured to contact a stop structure 325 (see also FIG. 20) formed on the housing 332.

In accordance with the present disclosure, the second embodiment of the wheeled cart 300 also includes a brake release device 296 (FIG. 15) configured to disengage the brake assemblies 230 independent of the brake control mechanism 220 when the cart is nested. That is, the brake release device 296 disengages the brake assembly without input from the brake control mechanism 220 and whether or not the handle 216 is rotated.

FIGS. 24-29 illustrate an alternative embodiment of the brake release device 296. As previously described with regard to the first embodiment, when the carts are nested (FIGS. 24 and 25), the trailing cart 300b engages the brake release device 296 of a leading cart 300a. The brake release device 296 causes the actuation assembly 294 (FIG. 21) to disengage the brake assembly 230, thereby permitting rotation of the rear wheels 218 for nested transport.

Referring to FIGS. 26-29, the second embodiment of the brake release device 296 is positioned adjacent to the lower portion 254 of at least one of the rearward upright support member 212. The brake release device 296 generally includes an engagement lever 372 connected to a housing 374. In the illustrated embodiment of FIG. 27, the housing 374 includes a first housing compartment 353 and a second housing compartment 355. The first and second compartments 353, 355 are separated by a divider structure 357.

Figure 28:
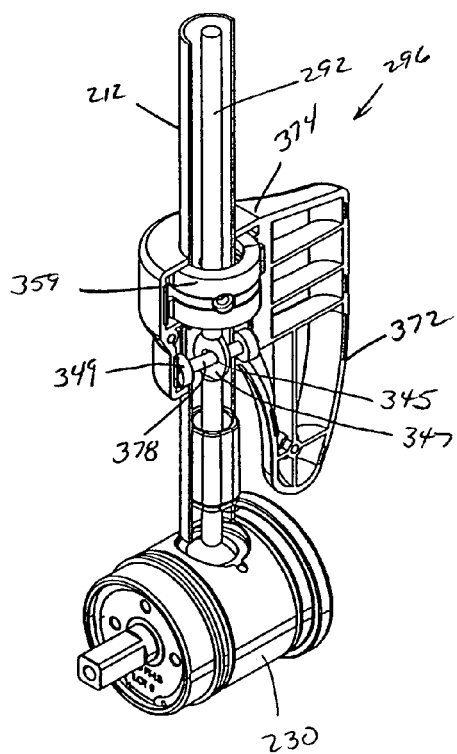
FIG. 28 is a partial perspective view of the brake release device of FIG. 27 and the actuation assembly of FIG. 18, shown in a first position.
Figure 29:
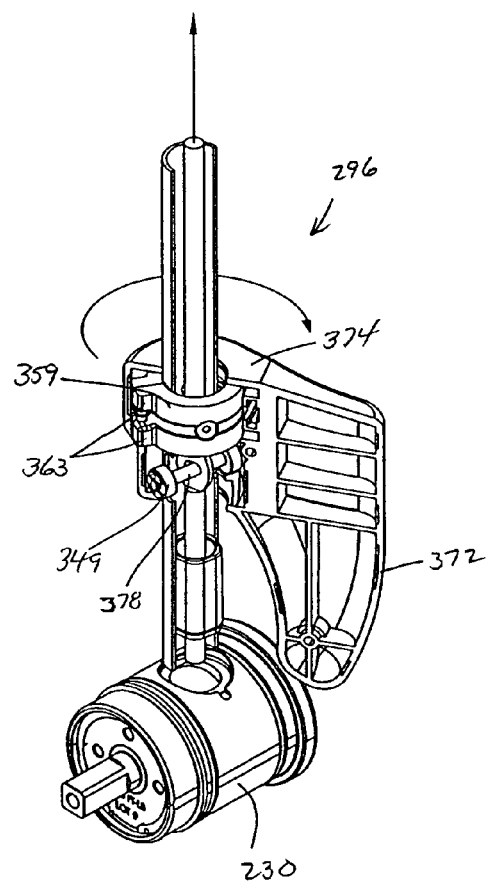
FIG. 29 is a partial perspective view of the brake release device and actuation assembly of FIG. 28, shown in a second pivoted position.

Referring to FIGS. 26 and 27, the brake release device 296 includes collar 359 fastened or secured to the upright support member 212. The collar 359 is positioned within the first housing compartment 353 when the brake release device 296 is fully assembled (FIGS. 28 and 29). An extension spring 361 is coupled to the collar 359 and the housing 374. In particular, one end of the extension spring 361 is connected to bosses 363 formed on the collar 359 by a first pin connection 365. The opposite end of the extension spring 361 is connected to the housing 374 by a second pin connection 367. The extension spring 361 biases the housing to a non-pivoted position as shown in FIGS. 15 and 24.

Figure 30:
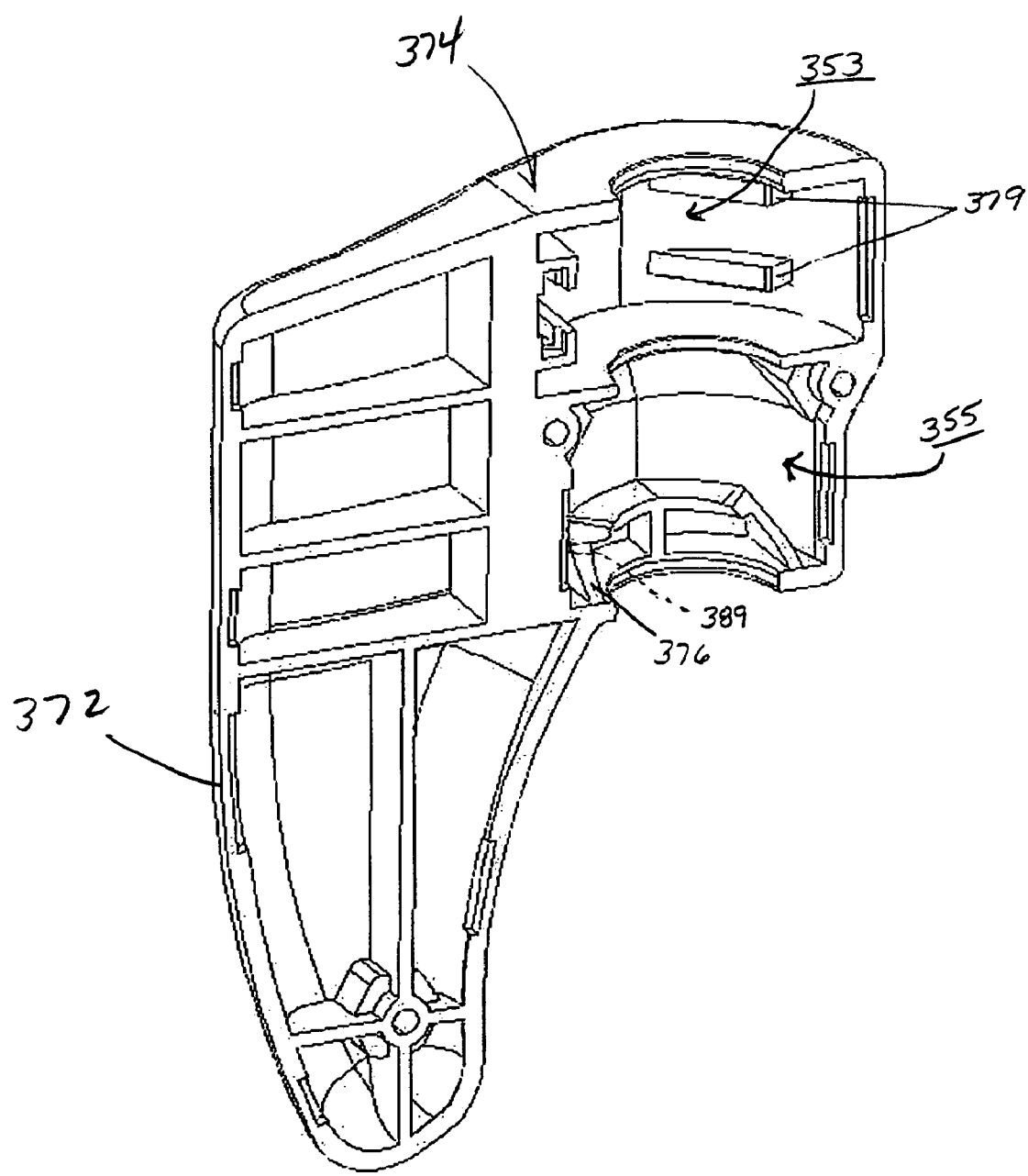
FIG. 30 is a perspective view of a component of the brake release device shown in FIG. 15.

The housing 374 preferably includes at least one inclined plane or cam surface 376. In the illustrated embodiment, the housing 374 has two cam surfaces 376 located in opposite halves of the housing (FIGS. 27 and 30). The cam surfaces 376 are located within the second housing compartment 355 of the housing 376.

When a trailing cart 300b (FIG. 24) is not nested or engaged with a leading cart 300a, the engagement lever 372 of the brake release deice 296 extends inward towards the center of the cart frame 210 (see also FIG. 15). When a trailing cart 300b engages the leading cart 300a, the engagement lever 372 rotates or pivots forward, as shown by the arrows in FIG. 25. Rotation of the engagement lever 372 is caused by contact of the lever 372 with the outer lower support member 256 of the trailing cart 300b.

Referring to FIG. 26, a dowel or lift pin 378 is fixed in relation to the brake rod 292. In particular, the pin 378 extends through slots 298 formed in the upright member 212 and is positioned through an aperture 345 (FIG. 28) formed in a flat 347 of the brake rod 292. Rollers 349 are positioned on ends of the pin 378. As can be understood, the arrangement of the pin 378 rotationally fixes the brake rod 292 relative to the support member 212.

Referring to FIGS. 28 and 29, when the housing 374 pivots, the rollers 349 (rotationally fixed) roll along the cam surfaces 376. The force of the cam surfaces 376 acting upon the lift pin 378 and brake rod 292 is sufficient enough to overcome the force from the spring 306 of the activation assembly 294, which acts downward upon the brake rod 292. The cam surfaces 376 thereby push the pin 378, and the brake rod 292, upward as the housing pivots 374. The slots 298 formed in the support member 212 are configured and oriented to accommodate the upward movement of the pin 378. As the pin 378 and brake rod 292 move upward, the end portion 316 (FIG. 21) of the brake rod 292 lifts off the target 318, thereby disengaging the brake assembly 230.

Referring back to FIG. 27, the housing 374 pivots relative to the collar 359. The collar 359 is configured to function as a bearing surface upon which the housing 374 pivots. When the housing pivots, the extension spring 361 extends. The collar 359 further includes a groove structure 377 that functions to contain and guide the extension spring 361 as the housing 374 pivots.

When a cart 300 is removed from a nested group of carts, the extension spring 361 biases the brake release device 296 back to the original non-pivoted position shown in FIG. 24. As the brake release device 296 returns to the non-pivoted position, force from the spring 306 of the actuation assembly 294 also causes the brake rod 292, pin 378 and rollers 249 to follow the cam surface 376 back to the original position. As the brake rod 292 returns to the original position, the end 316 of the rod 292 engages and activates the brake assembly 230.

In an alternative embodiment, the cam surface 376 may include a detent 389 (shown in phantom in FIG. 30) to maintain the brake rod 292 in the lifted position even when the cart 300 is removed from a nested group. This arrangement would permit movement of the un-nest cart 300 until the handle 216 is rotated. That is, by rotating the handle 216, the brake rod 292 is further lifted thereby raising the rollers 249 out from the detent 389 and permitting the extension spring 361 to return the brake release device 296 back to the original non-pivoted position.

The housing 374 of the brake release device 296 shown in FIGS. 27-29 is a right-handed housing configured to attach to the right upright support member 212. Referring now to FIG. 30, half of a left-handed housing 374 is illustrated. The left-handed housing is a mirror image of the right-handed housing. The left-handed housing view illustrates stops or ribs 379 that are also incorporated into the right-handed housing. Referring to FIG. 30, rotation of the housing 374 is limited by the ribs 379 formed in the first housing compartment 353 of the housing 374. In particular, the ribs 379 contact the bosses 363 of the collar 359 when the housing 374 has rotated a predetermined distance.

The above specification provides a complete description of two embodiments of the Brake Assembly and Control Mechanism for a Cart, and Method. Since many embodiments of the invention can be made without departing from the spirit and scope of the invention, the invention resides in the claims hereinafter appended.

I claim:

1. A cart for carrying cargo, the cart comprising:
    a frame having support members that define a cargo carrying region;
    an axle connected to the frame and configured for rotation about an axis;
    a brake mechanism mounted to the frame arranged and configured to engage the axle to provide braking operation of the cart and to disengage the axle to permit free rotation of the axle;
    a brake actuation device mounted on the frame and operably connected to the brake mechanism;
    a wheel mounted to the axle;
    a brake release device attached to the frame and operably connected to the brake mechanism, the brake release device being configured to pivot from a first position to a second position, wherein the brake release device causes the brake mechanism to disengage the axle to permit rotation of the wheel when the brake release device is moved into the second position;
    wherein the brake mechanism remains disengaged when the brake release device returns to the first position from the second position, and remains disengaged until the brake actuation device of the cart is actuated.

2. The cart of claim 1, wherein the wheel is longitudinally spaced along the axle from the brake mechanism.

3. The cart of claim 1, wherein the brake mechanism includes a wrap-spring configured to engage and to disengage the axle.

4. The cart of claim 1, wherein the brake actuation device comprises a rotatable handle.

5. The cart of claim 4, further including a brake control arrangement configured to disengage the brake mechanism when the handle of the cart is rotated.

6. The cart of claim 5, wherein the brake control arrangement disengages the brake mechanism when the handle of the cart is rotated in a first direction.

7. The cart of claim 5, wherein the brake control arrangement disengages the brake mechanism when the handle of the cart is rotated in either the first direction or a second opposite direction.

8. The cart of claim 1, wherein the cart is a first cart, and wherein the brake release device of the first cart pivots to the second position when a second cart is nested within the frame of the first cart.

9. The cart of claim 4, wherein the brake mechanism remains disengaged when the brake release device returns to the first position from the second position, and remains disengaged until the handle of the cart is rotated and released.

10. The cart of claim 1, wherein the brake mechanism is engaged when the handle is in a non-rotated position and the brake release device is in the first position.

11. The cart of claim 10, wherein the brake mechanism is disengaged when the handle is rotated or when the brake release device is in the second position.

12. The cart of claim 4, wherein the brake actuation device further includes a brake rod, the brake rod having a first end operably interconnected to the handle and a second end located adjacent to the brake mechanism, the brake rod being positioned within one of the support member of the frame.

13. A brake and control assembly for a cart of the type having a frame, a handle, and a wheel; the brake and control assembly comprising:
    a brake assembly configured to directly mount to the frame of the cart, the brake assembly comprising a brake mechanism and an axle configured to connect to the wheel of the cart, wherein one end of the axle longitudinally extends from the brake mechanism and the wheel of the cart couples to said one end of the axle and is thereby spaced from the brake mechanism, wherein the brake mechanism is arranged and configured to selectively engage and disengage the axle during braking and non-braking operations of the cart respectively;
    a brake control arrangement configured to couple to the handle of the cart, the brake control arrangement including an actuation member positioned adjacent to the brake assembly to control the braking and non-braking operation of the cart; and
    a brake release device configured to disengage the brake assembly independent of the brake control arrangement.

14. The brake and control assembly of claim 13, wherein the brake mechanism compresses radially towards the axle during braking operation of the cart.

15. The brake and control assembly of claim 13, wherein the brake assembly further comprises a wheel bearing that permits free rotation of the axle when the brake mechanism is operatively disengaged from the axle.

16. A method of operating a cart having a frame, an axle mounted to the frame, a brake mechanism mounted to the frame and operably connected to the axle, a brake actuator mounted to the frame and operably connected to the brake mechanism such that the brake actuator is biased to engage the brake mechanism, a brake release device mounted to the frame and operably connected to the brake mechanism, and a wheel cantilevered on the axle and thereby spaced from the brake mechanism, the method comprising:
    enabling unnested movement of the cart relative to a second cart by disengaging the brake mechanism by moving the brake actuator from a first position of the brake actuator to a second position of the brake actuator and maintaining the brake actuator in the second position of the brake actuator, wherein disengaging the brake mechanism permits free rotation of the axle;
    enabling braking of the cart by reengaging the brake mechanism by moving the brake actuator from the second position of the brake actuator to the first position of the brake actuator, wherein the brake mechanism contacts the axle to provide braking operation of the cart; and
    enabling nested movement of the cart relative to the second cart by disengaging the brake mechanism by moving the brake release device from a first position of the brake release device to a second position of the brake release device, wherein movement of the brake release device from the second position of the brake release device to the first position of the brake release device upon unnesting of the cart from the second cart does not reengage the brake mechanism.

17. The method of claim 16 wherein the brake actuator comprises a rotatable handle, wherein rotating and releasing the handle disengages and engages the brake mechanism respectively.

18. The method of claim 16, further including enabling braking of the cart after moving the brake release device from the first release position to the second release position by moving the brake actuator.

19. A cart for carrying cargo, the cart comprising:
   a frame having support members that define a cargo carrying region;
   a brake actuation device connected to the frame;
   a brake assembly mounted to the frame, the brake assembly being configured to be engaged by movement of the brake actuation device from a first position to a second position and disengaged by movement of the brake actuation device from the second position back to the first position; and
   a brake release device attached to the frame, the brake release device configured to disengage the brake assembly to permit transport of the cart when the brake release device is moved from an original position to another position, the brake release device including a retainer arrangement configured to maintain disengagement of the brake assembly when the brake release device is moved back to the original position.

20. The cart of claim 19, wherein the cart is a first cart, and wherein the brake release device of the first cart is actuated when a second cart is nested within the frame of the first cart.

21. The cart of claim 19, wherein the first cart includes stops positioned to limit a depth to which the second cart nests within the first cart.

22. The cart of claim 19, wherein the wheel and the brake mechanism are arranged and configured such that the wheel is configured to fit within a guiding wheel slot of a cart retention station with the brake mechanism being external of the guiding wheel slot.

23. The cart of claim 19, wherein the brake mechanism is arranged and configured to engage the axle by wrapping down on the axle to provide braking operation of the cart and to disengage the axle to permit free rotation of the axle.

24. The cart of claim 19, wherein the retainer arrangement is configured to maintain disengagement of the brake assembly until the brake actuation device is actuated.

25. A method of transporting carts, including at least a first cart and a second cart, each cart including a brake assembly, a brake actuation device, and a brake release device, the brake actuation device arranged and configured to engage and disengage the brake assembly, the method comprising
   actuating the brake release device of the first cart by nesting the second cart within the first cart;
   disengaging the brake assembly of the first cart by actuating the brake release device of the first cart, wherein unnesting the second cart from the first cart causes deactuation of the brake release device of the first cart, but does not cause reengagement of the brake assembly of the first cart; and
   transporting the first and second nested carts.

26. The method of claim 25, wherein the brake actuation device comprises a rotatable handle configured to disengage and engage the brake assembly.

* * * * *